(12) United States Patent
Wei et al.

(10) Patent No.: US 12,058,206 B1
(45) Date of Patent: Aug. 6, 2024

(54) PERFORMANCE-BASED RECOMMENDATION SERVICES FOR WORKLOAD ORCHESTRATION

(71) Applicant: Equinix, Inc., Redwood City, CA (US)

(72) Inventors: Jun Wei, Saratoga, CA (US); Mohsen Houshmand, Los Gatos, CA (US)

(73) Assignee: Equinix, Inc., Redwood City, CA (US)

( * ) Notice: Subject to any disclaimer, the term of this patent is extended or adjusted under 35 U.S.C. 154(b) by 169 days.

(21) Appl. No.: 17/553,222

(22) Filed: Dec. 16, 2021

Related U.S. Application Data

(60) Provisional application No. 63/130,268, filed on Dec. 23, 2020.

(51) Int. Cl.
*H04L 67/1029* (2022.01)
*H04L 43/0817* (2022.01)
*H04L 67/1008* (2022.01)
*H04L 67/61* (2022.01)

(52) U.S. Cl.
CPC ...... *H04L 67/1029* (2013.01); *H04L 43/0817* (2013.01); *H04L 67/1008* (2013.01); *H04L 67/61* (2022.05)

(58) Field of Classification Search
None
See application file for complete search history.

(56) References Cited

U.S. PATENT DOCUMENTS

| | | | |
|---|---|---|---|
| 9,886,267 B2 | 2/2018 | Maheshwari et al. | |
| 9,948,552 B2 | 4/2018 | Teng et al. | |
| 10,129,078 B2 | 11/2018 | Kumar et al. | |
| 10,158,727 B1* | 12/2018 | Mukhopadhyaya | H04W 4/023 |
| 10,949,261 B2 | 3/2021 | Yang | |
| 2019/0068438 A1* | 2/2019 | Kumar | H04L 41/20 |
| 2020/0267216 A1* | 8/2020 | Haggart | G06F 9/5088 |
| 2021/0365348 A1* | 11/2021 | Kuperman | G06F 11/3447 |

(Continued)

OTHER PUBLICATIONS

U.S. Appl. No. 63/029,104, filed 2020.*

(Continued)

*Primary Examiner* — June Sison
(74) *Attorney, Agent, or Firm* — Shumaker & Sieffert, P.A.

(57) ABSTRACT

This disclosure describes a cloud exchange that offers dynamic network connectivity and performance-based recommendation services for application workloads. For example, a cloud exchange comprises a network configured with respective network connections to at least one of a plurality of cloud service providers (CSPs), wherein an application workload is deployed to a first CSP according to a first application workload deployment scenario, wherein the application workload is for a customer of the first CSP; and a programmable network platform configured to: receive telemetry information of the network for the network connections; determine, based on the telemetry information, whether the application workload meets a performance objective; and in response to determining that the application workload does not meet the performance objective, send, to the customer, a recommendation for a second application workload deployment scenario that includes a deployment template to configure a second CSP with the second application workload deployment scenario.

20 Claims, 8 Drawing Sheets

(56) References Cited

U.S. PATENT DOCUMENTS

2022/0121455 A1* 4/2022 Hoban ................. G06Q 10/087

OTHER PUBLICATIONS

Rosen et al., "BGP/MPLS IP Virtual Private Networks (VPNs)," Network Working Group, RFC 4364, Feb. 2006, 47 pp.
Wei et al., "Leveraging Service Mesh for Enterprise Multi-Cloud-Strategy," ServiceMeshCon North America, Oct. 12, 2021, 1 pp.

* cited by examiner

PERFORMANCE-BASED RECOMMENDATION SERVICES FOR WORKLOAD ORCHESTRATION

This application claims the benefit of U.S. Provisional Patent Application No. 63/130,268, filed Dec. 23, 2020, the entire contents of which is incorporated herein by reference.

TECHNICAL FIELD

The disclosure relates to computer networks and orchestration and, more specifically, to application workload deployment using cloud computing.

BACKGROUND

Cloud computing refers to the use of dynamically scalable computing resources accessible via a network, such as the Internet. The computing resources, often referred to as a "cloud," provide one or more services to users. These services may be categorized according to service types, which may include for example, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS), Platform-as-a-Service (PaaS), Infrastructure-as-a-Service (IaaS), Storage-as-a-Service, and so forth.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

SUMMARY

In general, this disclosure describes a cloud-based services exchange (or simply "cloud exchange") that offers dynamic network connectivity and performance-based recommendation services for application workloads. For example, customers may deploy application workloads in hybrid or multi-cloud environments. In a hybrid cloud deployment scenario, part of an application workload is deployed in a private cloud and another part of the application workload is deployed in a public cloud. In a multi-cloud deployment scenario, part of an application workload is deployed in one public cloud and another part of the application workload is deployed in another public cloud. Cloud service providers may also be deployed external to a cloud exchange or internally in the cloud exchange (referred to as "co-located").

Cloud service providers may provide one or more cloud services that must meet specified performance objectives (e.g., service level objectives) of a service level agreement (SLA). In some examples, existing application workload deployments may no longer meet the performance objectives and a new application workload deployment is needed. However, each of the deployment options may have different overall cost estimates and/or performance. As described herein, the cloud exchange may be configured to provide, to customers, performance-based recommendations that define new application workload deployment scenarios that meet performance objectives and, in some examples, the budget needed to deploy the application workload.

As one example, a platform for the cloud exchange may obtain telemetry information (e.g., service level indicators) about the cloud service providers, obtain telemetry information about the cloud exchange that provides connection between customers with the cloud service providers, and evaluate the telemetry information with performance objectives to determine whether an existing application workload deployment ("first application workload deployment") meets the performance objectives. In response to determining that the existing application workload deployment does not meet the performance objectives, the cloud exchange may provide a recommendation, to customers and/or cloud service providers, for a new application workload deployment scenario ("second application workload deployment") that meets the performance objectives. Because the telemetry information includes telemetry information about the cloud exchange, the evaluation may be based on a comparison of end-to-end service level indicators for application traffic between workloads that is service provider neutral and that may be based, at least in part, on service level indicators for application traffic among a mesh of different cloud providers and traversing the cloud exchange network.

The recommendation may include, for example, an application workload deployment template ("deployment template") that may specify deployment information and which a service mesh manager of a service mesh (e.g., Istio) provided by a cloud service provider may use to deploy the new application workload deployment scenario in the cloud service provider network. In some examples, the recommendation may also include a total cost to realize the new deployment scenario, including the cost of storage and/or compute nodes provided by cloud service providers, and the cost of network connections and/or data movement to realize the new deployment scenario. The techniques may be applied in a similar way to determine an application workload deployment scenario for a new application with distributed workloads using the various telemetry information describing performance of cloud service providers and the cloud exchange based on an already-deployed application.

The techniques may provide one or more technical advantages that enable at least one practical application. For example, because the cloud exchange may have a more extensive cost analysis that considers, in addition to the cost of storage and compute nodes provided by cloud service providers, the cost of network connections and the cost of data movement only known by the cloud exchange, the cloud exchange may provide customers with performance-based recommendations of application deployment scenarios that are more accurately aligned with the budget of customers.

In one example, a cloud exchange comprises a network configured with respective network connections to at least one of a plurality of cloud service providers (CSPs), wherein an application workload is deployed to a first CSP of the plurality of CSPs according to a first application workload deployment scenario, wherein the application workload is for a customer of a cloud service provider of the cloud exchange; and a programmable network platform comprising processing circuitry and configured to: receive telemetry information of the network for the network connections; determine, based on the telemetry information of the network, whether the application workload meets a performance objective; and in response to a determination that the application workload does not meet the performance objective, send, to the customer, a recommendation for a second application workload deployment scenario, wherein the recommendation includes a deployment template to configure a second CSP of the plurality of CSPs with the second application workload deployment scenario.

In one example, a method comprises receiving, by a programmable network platform of a cloud exchange comprising a network configured with respective network connections to at least one of a plurality of cloud service providers (CSPs), telemetry information of the network for the network connections, wherein an application workload is deployed to a first CSP of the plurality of CSPs according to a first application workload deployment scenario, wherein the application workload is for a customer of a cloud service provider of the cloud exchange; determining, by the programmable network platform and based on the telemetry information of the network, whether the application workload meets a performance objective; and in response to determining that the application workload does not meet the performance objective, sending, by the programmable network platform and to the customer, a recommendation for a second application workload deployment scenario, wherein the recommendation includes a deployment template to configure a second CSP of the plurality of CSPs with the second application workload deployment scenario.

In one example, a non-transitory computer readable storage medium comprises instructions that when executed cause one or more processors of a programmable network platform of a cloud exchange to: receive telemetry information of a network of the cloud exchange, the network configured with respective network connections to at least one of a plurality of cloud service providers (CSPs), wherein an application workload is deployed to a first CSP of the plurality of CSPs according to a first application workload deployment scenario, wherein the application workload is for a customer of a cloud service provider of the cloud exchange; receive telemetry information of the network for the network connections; determine, based on the telemetry information of the network, whether the application workload meets a performance objective; and in response to a determination that the application workload does not meet the performance objective, send, to a customer, a recommendation for a second application workload deployment scenario, wherein the recommendation includes a deployment template to configure a second CSP of the plurality of CSPs with the second application workload deployment scenario.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
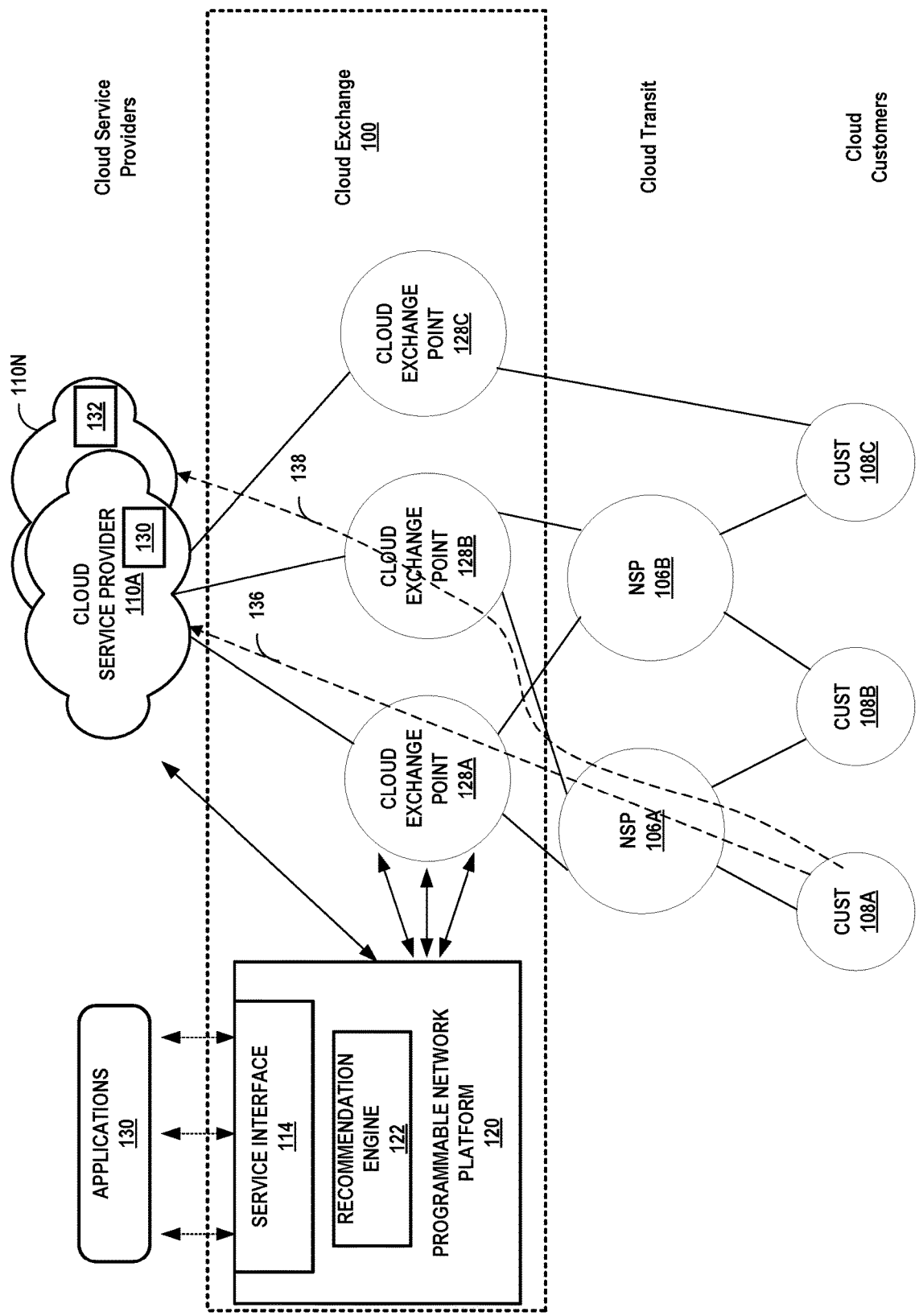
FIG. 1 is a block diagram that illustrates a conceptual view of a network system having a cloud-based services exchange that provides performance-based recommendation services for enterprise workload orchestration, in accordance with the techniques described herein.

FIG. 1 illustrates a conceptual view of a network system having a cloud-based services exchange 100 ("cloud exchange 100") that provides performance-based recommendation services for enterprise workload orchestration, in accordance with the techniques described herein. Each of cloud-based services exchange points 128A-128C (described hereinafter as "cloud exchange points" and collectively referred to as "cloud exchange points 128") of cloud exchange 100 may represent a different data center geographically located within the same metropolitan area ("metro-based," e.g., in New York City, New York; Silicon Valley, California; Seattle-Tacoma, Washington; Minneapolis-St. Paul, Minnesota; London, United Kingdom; etc.) to provide resilient and independent cloud-based services exchange by which cloud-based services customers ("cloud customers") and cloud-based service providers ("cloud providers") connect to receive and provide, respectively, cloud services. In various examples, cloud exchange 100 may include more or fewer cloud exchange points 128. In some instances, a cloud exchange 100 includes just one cloud exchange point 128. As used herein, reference to a "cloud exchange" or "cloud-based services exchange" may refer to a cloud exchange point. A cloud exchange provider may deploy instances of cloud exchanges 100 in multiple different metropolitan areas, each instance of cloud exchange 100 having one or more cloud exchange points 128.

Each of cloud exchange points 128 includes network infrastructure and an operating environment by which cloud customers 108A-108D (collectively, "cloud customers 108") receive cloud services from multiple cloud service providers 110A-110N (collectively, "cloud service providers 110"). Cloud exchange 100 provides customers of the exchange, e.g., enterprises, network carriers, network service providers, Software-as-a-Service (SaaS), etc. customers, with secure, private, virtual connections to multiple cloud service providers (CSPs) globally. The multiple CSPs participate in the cloud exchange by virtue of their having at least one accessible port in the cloud exchange by which a customer can connect to the one or more cloud services offered by the CSPs, respectively. Cloud exchange 100 allows private networks of any customer to be directly cross-connected to any other customer at a common point, thereby allowing direct exchange of network traffic between the networks of the customers.

Cloud customers 108 may receive cloud-based services directly via a layer 3 (L3) peering and physical connection to one of cloud exchange points 128 or indirectly via one of network service providers 106A-106B (collectively, "NSPs 106," or alternatively, "carriers 106"). NSPs 106 provide "cloud transit" by maintaining a physical presence within one or more of cloud exchange points 128 and aggregating layer 3 access from one or customers 108. NSPs 106 may peer, at layer 3, directly with one or more cloud exchange points 128 and in so doing offer indirect layer 3 connectivity and peering to one or more customers 108 by which customers 108 may obtain cloud services from the cloud exchange 100. Each of cloud exchange points 128, in the example of FIG. 1, is assigned a different autonomous system number (ASN). For example, cloud exchange point 128A is assigned ASN 1, cloud exchange point 128B is assigned ASN 2, and so forth. Each cloud exchange point 128 is thus a next hop in a path vector routing protocol (e.g., BGP) path from cloud service providers 110 to customers 108. As a result, each cloud exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, cloud exchange points 128 may internalize the eBGP peering relationships that cloud service providers 110 and customers 108 would maintain on a pair-wise basis. Instead, a customer 108 may configure a single eBGP peering relationship with a cloud exchange point 128 and receive, via the cloud exchange, multiple cloud services from one or more cloud service providers 110. While described herein primarily with respect to eBGP or other layer 3 routing protocol peering between cloud exchange points and customer, NSP, or cloud service provider networks, the cloud exchange points may learn routes from these networks in other ways, such as by static configuration, or via Routing Information Protocol (RIP), Open Shortest Path First (OSPF), Intermediate System-to-Intermediate System (IS-IS), or other route distribution protocol.

As examples of the above, customer 108C is illustrated as having contracted with a cloud exchange provider for cloud exchange 100 to directly access layer 3 cloud services via cloud exchange points 128C and also to have contracted with NSP 106B to access layer 3 cloud services via a transit network of the NSP 106B. In this way, customer 108C receives redundant layer 3 connectivity to cloud service provider 110A, for instance. Customer 108B is illustrated as having contracted with multiple NSPs 106A, 106B to have redundant cloud access to cloud exchange points 128A, 128B via respective transit networks of the NSPs 106A, 106B. The contracts described above are instantiated in network infrastructure of the cloud exchange points 128 by L3 peering configurations within switching devices of NSPs 106 and cloud exchange points 128 and L3 connections, e.g., layer 3 virtual circuits, established within cloud exchange points 128 to interconnect cloud service provider 110 networks to NSPs 106 networks and customer 108 networks, all having at least one port offering connectivity within one or more of the cloud exchange points 128.

In some examples, cloud exchange 100 allows a corresponding one of customers 108A, 108B of any network service providers (NSPs) or "carriers" 106A-106B (collectively, "NSPs 106" or "carriers 106") or other cloud customers including customer 108C to be directly connected, via a virtual layer 2 (L2) or layer 3 (L3) connection to any other customer network and/or to any of CSPs 110, thereby allowing direct exchange of network traffic among the customer networks and CSPs 110. The virtual L2 or L3 connection may be referred to as a "virtual circuit."

Carriers 106 may each represent a network service provider that is associated with a transit network by which network subscribers of the carrier 106 may access cloud services offered by CSPs 110 via the cloud exchange 100. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 100.

In this way, cloud exchange 100 streamlines and simplifies the process of partnering CSPs 110 and customers (via carriers 106 or directly) in a transparent and neutral manner. One example application of cloud exchange 100 is a co-location and interconnection data center in which CSPs 110 and carriers 106 and/or customers 108 may already have network presence, such as by having one or more accessible ports available for interconnection within the data center, which may represent any of cloud exchange points 128. This allows the participating carriers, customers, and CSPs to have a wide range of interconnectivity options within the same facility. A carrier/customer may in this way have options to create many-to-many interconnections with only a one-time hook up to one or more cloud exchange points 128. In other words, instead of having to establish separate connections across transit networks to access different cloud service providers or different cloud services of one or more cloud service providers, cloud exchange 100 allows customers to interconnect to multiple CSPs and cloud services.

Cloud exchange 100 includes a programmable network platform 120 for dynamically programming cloud exchange 100 to responsively and assuredly fulfill service requests that encapsulate business requirements for services provided by cloud exchange 100 and/or cloud service providers 110 coupled to the cloud exchange 100. The programmable network platform 120 may, as a result, orchestrate a business-level service across heterogeneous cloud service providers 110 according to well-defined service policies, quality of service policies, service level agreements, and costs, and further according to a service topology for the business-level service.

The programmable network platform 120 enables the cloud service provider that administers the cloud exchange 100 to dynamically configure and manage the cloud exchange 100 to, for instance, facilitate virtual connections for cloud-based services delivery from multiple cloud service providers 110 to one or more cloud customers 108. The cloud exchange 100 may enable cloud customers 108 to bypass the public Internet to directly connect to cloud services providers 110 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

In other examples, programmable network platform 120 enables the cloud service provider to configure cloud exchange 100 with a L3 instance requested by a cloud customer 108, as described herein. A customer 108 may request an L3 instance to link multiple cloud service providers by the L3 instance, for example (e.g., for transferring the customer's data between two cloud service providers, or for obtaining a mesh of services from multiple cloud service providers).

Programmable network platform 120 may represent an application executing within one or more data centers of the cloud exchange 100 or alternatively, off-site at a back office or branch of the cloud provider (for instance). Programmable network platform 120 may be distributed in whole or in part among the data centers, each data center associated with a different cloud exchange point 128 to make up the cloud exchange 100. Although shown as administering a single cloud exchange 100, programmable network platform 120 may control service provisioning for multiple different cloud exchanges. Alternatively or additionally, multiple separate instances of the programmable network platform 120 may control service provisioning for respective multiple different cloud exchanges.

In the illustrated example, programmable network platform 120 includes a service interface (or "service API") 114 that defines the methods, fields, and/or other software primitives by which applications 130, such as a customer portal, may invoke the programmable network platform 120. The service interface 114 may allow carriers 106, customers 108, cloud service providers 110, and/or the cloud exchange provider programmable access to capabilities and assets of the cloud exchange 100 according to techniques described herein.

For example, the service interface 114 may facilitate machine-to-machine communication to enable dynamic provisioning of virtual circuits in the cloud exchange for interconnecting customer and/or cloud service provider networks. In this way, the programmable network platform 120 enables the automation of aspects of cloud services provisioning. For example, the service interface 114 may provide an automated and seamless way for customers to establish, de-install and manage interconnections among multiple, different cloud providers participating in the cloud exchange.

Further example details of a cloud-based services exchange can be found in U.S. patent application Ser. No. 15/099,407, filed Apr. 14, 2016 and entitled "CLOUD-BASED SERVICES EXCHANGE;" U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 14/927,306, filed Oct. 29, 2015 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

Cloud services offered by cloud service providers 110 may be categorized according to service types, which may include for example, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS), Platform-as-a-Service (PaaS), and Infrastructure-as-a-Service (IaaS), respectively.

In the example of FIG. 1, cloud service providers 110 may provide Platform-as-a-Service (PaaS), Software-as-a-Service (SaaS), Infrastructure-as-a-Service (IaaS), or Security-as-a-Service (SECaaS) (e.g., Distributed Denial of Service (DDoS) Mitigation-as-a-Service (DDoSMaaS)) to customers 108 that use the cloud service provider 110 networks to execute applications requiring access to SaaS or other cloud services accessible via cloud exchange 100.

In the example of FIG. 1, customers 108 may deploy application workloads that use one or more cloud services. An application workload may be implemented using a virtual machine or container. A container is more lightweight than a virtual machine and more likely to migrate from one computing environment to another. Like a virtual machine (VM), each container is virtualized an may remain isolated from the host machine and other containers. However, unlike a virtual machine, each container may omit an individual operating system and provide only an application suite and application-specific libraries. Each container is executed by the host machine as an isolated user-space instance and may share an operating system and common libraries with other containers executing on the host machine. Thus, a cloud computing system based on containers may require much less processing power, storage, and network resources than a cloud computing system based on virtual machines. Containers may also be referred to as virtualization engines, virtual private servers, silos, or jails. In some instances, the techniques described herein with respect to container may be applied to virtual machines or other virtualized components. CSPs 110 may include compute and/or storage nodes to implement the containerized computing environment.

An application workload may be implemented as a set of focused and distinct features or functions, referred to as a "microservice." The term application workload may be used interchangeably with "microservices" throughout this disclosure, though an application workload may refer to other types of workloads, such as natively-executing application code or to virtual machines executing application code. A microservice conforms to (or is usable in) an architectural pattern in which many dozens or even hundreds of microservices can be independently developed and deployed. A microservice is often organized around a business capability and implements a "broad-stack" of software for the business capability, including persistent storage and any external collaboration. The various microservices expose interfaces that enable the microservices to invoke one another to exchange data and perform the respective sets of functions in order to create an overall application. In other words, each microservice may be implemented as a set of services in which each service runs its own processes and communicates through its interfaces (e.g., APIs).

A cloud service provider may include a service mesh (e.g., Istio) that represents a network of microservices. A service mesh may provide a low-latency software infrastructure that handles communication between microservices. Cloud service providers may include a service mesh manager (e.g., an Istio daemon or "istiod") to connect, secure, and manage microservices. The service mesh manager may provide a way to control how microservices communicate with each other. For instance, the service mesh manager may manage traffic flows between services, enforce access policies, and aggregates telemetry data. The service mesh manager is used to configure the operation of the microservices. In this example, CSP 110A may include a service mesh manager for managing microservices 130.

Configuration of microservices may be based on templates (e.g., YAML templates, Istio templates), referred to herein as "deployment templates," that may specify configuration information for the service mesh. For example, service mesh manager of CSP 110A may use the deployment templates to configure service mesh of CSP 110A, such as configuring Kubernetes-specific attributes for microservices 130. Additional information regarding an example of a service mesh is further described in "Istio," available at https://istio.io.

In the example of FIG. 1, customer 108A may connect to microservices 130 implemented in CSP 110A via cloud exchange 100. For example, customer 108A may be connected, via virtual circuit 136 (e.g., virtual L2 or L3 connection), to access microservices 130 implemented in CSP 110A. In other words, cloud exchange 100 may simply provide network infrastructure that offers one-to-many network connectivity to enable multiple cloud service providers to provide services to customers (e.g., enterprises, NSPs).

The cloud exchange may operate with a service level agreement (SLA) having requirements, for example, for network uptime, data throughput, data latency, delay, jitter, etc. and try to ensure best possible user-level experience perceived by the customers subscribed to the CSPs offering a variety of cloud-based services like SaaS, PaaS, IaaS, etc. The SLAs offered may vary depending on the parties involved, such as (1) SLAs between the end customers and the cloud exchange, (2) SLAs between the cloud exchange and the CSPs, or (3) even SLAs between the end customers and the CSPs. There may or may not be complex dependency among different types of SLAs, but to enforce and track these SLAs, cloud exchange may measure and monitor various metrics in their network infrastructure on a periodic basis.

In some examples, customers (e.g., enterprises) may deploy an application workload in a hybrid cloud and/or multi-cloud infrastructure. A hybrid cloud combines a private cloud with one or more public clouds. A multi-cloud uses multiple different public clouds, typically from different cloud service providers. As one example, an application workload may be deployed in a hybrid and/or multi-cloud infrastructure where part of the application workload may be deployed in one public cloud (e.g., for its low storage cost), another part of the application workload is deployed in another public cloud (e.g., for its advanced analytics offering), while critical data is kept in a private cloud (e.g., for data governance requirements). Although the storage cost may be lower in one cloud service provider network, the cost for connection to the cloud service provider and the cost for moving data around may outweigh the benefit of the low storage cost. As used herein, the term "application workload" may refer to an individual instance of a virtual machine, container, other execution element, or native code executing a portion of a distributed application, or it may refer to all or a portion of an application workload that is represented by multiple such instances distributed over one or more cloud services and/or customer on-premises locations.

In some examples, the cost of deploying an application workload may change, e.g., by scaling resources for the application workload. Additionally, or alternatively, the performance of deploying the application workload may change, e.g., network connections to the cloud service providers no longer meet performance requirements (e.g., service level objectives (SLOs)). In these examples, a customer may need a new application workload deployment scenario that meets performance requirements and, in some examples, is within budget of the customer.

Typically, cloud service providers may only provide cost estimates for the usage of their resources (e.g., compute/storage nodes). In hybrid and multi-cloud environments, the cost of the network connections in between public clouds and private data centers is not provided for the reason that a customer may have multiple choices of network providers. There are third-party vendors providing unified cost recommendations across various workload deployment options, however, those cost recommendations are limited to the cost of the compute and storage resources at the cloud service providers, not including the cost of the network connections, for the same reason above. The cost estimates provided by cloud service providers are usually static and are not associated with real-time (RT) or near real-time (near-RT) performance.

In accordance with the techniques described herein, the cloud exchange may provide the customer with a recommendation for a new application workload deployment scenario that meets performance objectives (e.g., SLO) and/or is within budget of the customer.

As one example, an application workload may initially be deployed within CSP 110A (implemented as microservices 130). The programmable network platform 120 may, as a result of receiving a service request to access microservices 130, orchestrate a business-level service across cloud service providers 110 according to well-defined service policies, quality of service policies, service level agreements, and costs, and further according to a service topology for the business-level service. For example, the programmable network platform 120 may instantiate within a network infrastructure (e.g., routers) of the cloud exchange point 128A a layer 3 (L3) connection, e.g., virtual circuit 136, to enable customers to access microservices 130 provided by cloud service provider 110A.

Programmable network platform 120 may include a recommendation engine 122 that may provide a customer with a performance-based recommendation for a new application workload deployment scenario if the existing application workload deployment scenario does not meet the service level objectives (SLOs) of an SLA between customer 108A and CSP 110A. For example, programmable network platform 120 may obtain service level indicators (SLIs), such as telemetry information (e.g., metrics) about network infrastructure of cloud exchange 100 and telemetry information about the service mesh of cloud service provider network 110A. For instance, programmable network platform 120 may obtain telemetry information including information that describes connections of customer 108A and/or CSP 110A to cloud exchange point 128A. Telemetry information may include information about the quantity, type, and definition of network and resource configurations to realize virtual circuit 136. In some examples, the telemetry information may include performance metrics such as jitter, latency, packet loss, etc., of virtual circuit 136 In some cases, the telemetry information is application flow or application specific. Programmable network platform 120 may also receive telemetry information from cloud service provider 110A. For example, the service mesh manager (e.g., istiod) of CSP 110A may be configured to collect telemetry information about the service mesh of cloud service provider 110A. Programmable network platform 120 may interface (e.g., using an API) with the service mesh manager to obtain the telemetry information about the service mesh of cloud service provider 110A.

Recommendation engine 122 of programmable network platform 120 may determine, based on the telemetry information, whether the existing application workload deployment meets the SLO. If the telemetry information for the existing application workload deployment does not meet the SLO, recommendation engine 122 of programmable network platform 120 may provide a recommendation for a new application workload deployment scenario that meets the SLO.

For example, recommendation engine 122 may determine network connections within cloud exchange 100, and the compute and/or storage nodes provided by cloud service providers that are needed to realize the new application workload deployment scenario and meets the SLO. As one example, recommendation engine 122 may determine, based on the telemetry information, that microservices 130 should be migrated to a different cloud provider (e.g., CSP 110N), shown in FIG. 1 as microservices 132. For example, programmable network platform 120 may determine that a connection between customer 108A and CSP 110N (e.g., virtual circuit 138) has better performance than the connection for the existing application workload deployed on CSP 110A (e.g., virtual circuit 136). In this example, programmable network platform 120 may provide customer 108A with a recommendation for a new application workload deployment scenario to deploy microservices 132 in CSP 110N and/or to instantiate the network connection for the new application workload deployment scenario (e.g., virtual circuit 138). In some example deployments, a virtual circuit (not shown in FIG. 1) configured in cloud exchange 100 may connect workloads for a customer located in CSP 110A and workloads for the customer located in another CSP (not shown).

In some examples, the recommendation for the new deployment scenario includes a deployment template (e.g., Istio template) that the service mesh manager may use to configure the service mesh of cloud service provider 110N to realize the new application workload deployment scenario. For example, the deployment template may include Kubernetes-specific attributes for microservices 132.

In the example of FIG. 1, recommendation engine 122 may determine that the new application workload deployment scenario includes instantiating virtual circuit 138 to connect customer 108A to microservices 132 implemented in CSP 110N. The deployment template may, in some instances, include the network connection information needed to instantiate the connection within cloud exchange 100 to connect customer 108A and CSP 110N. In various examples, the new application workload deployment scenario may move some portion of the workload to a different provider for a given cloud service or may change from on-premises workload execution to a cloud execution (or vice-versa). Other modifications to the deployment scenario are possible.

In some examples, programmable network platform 120 may in response to determining that the existing application workload does not meet the performance objective, configure cloud exchange 100 to realize the new application workload deployment scenario. For example, in response to determining that the existing application workload (e.g., microservices 130) does not meet the performance objective, recommendation engine 122 may cause programmable network platform 120 to dynamically configure cloud exchange 100 to, for instance, facilitate virtual connections (e.g., virtual circuit 138) for cloud-based services delivery from cloud service provider 110N to cloud customer 108A.

In some examples, recommendation engine 122 may provide the customer with a performance-based recommendation that is based on the cost of deploying the new application workload scenario. For example, recommendation engine 122 may determine the cost of compute and/or storage nodes provided by CSPs 110 to implement the new application workload. Recommendation engine 122 may also determine the cost to instantiate connections within cloud exchange 100 to realize the new application workload. The cost to instantiate connections within cloud exchange 100 may depend on various factors, such as geographic location, the type of performance of the connection, etc. When generating the recommendation for the new application workload deployment scenario, recommendation engine 122 may take into consideration the budget of the customer (e.g., specified along with the service request for the initial application workload deployment scenario) and provide the recommendation if the cost to realize the new application workload deployment scenario is within the customer's budget. In some examples, the recommendation for the new application workload deployment scenario includes the cost to realize the new application workload deployment scenario, such as the cost of compute/storage nodes provided by CSP 110N to implement microservices 132 for the new application workload and the cost to instantiate virtual circuit 138 to connect customer 108A to the new application workload provided by CSP 110N. Additional examples of the cost and performance-based recommendation is described in FIG. 6 below.

Figure 2:
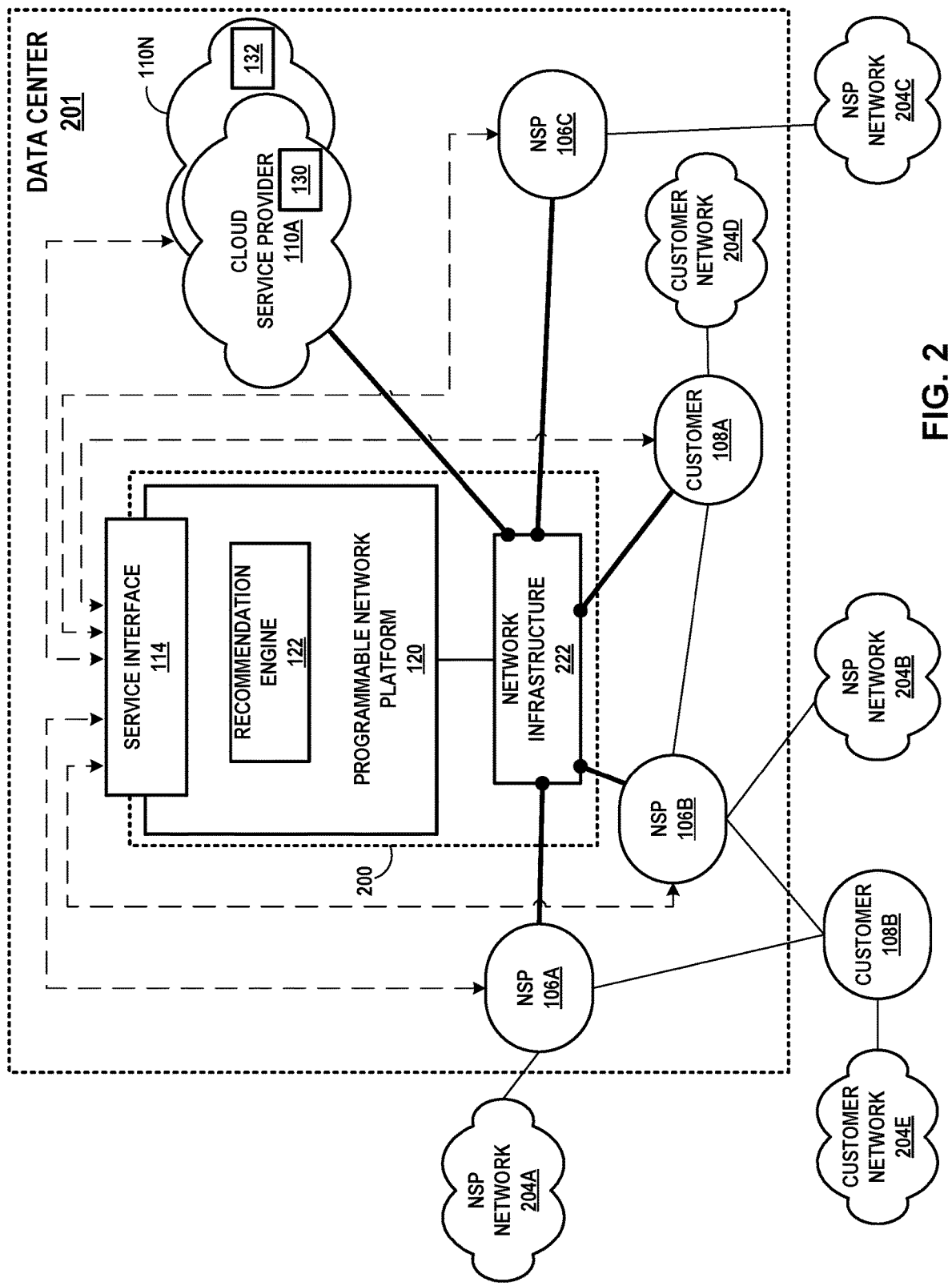
FIG. 2 is a block diagram illustrating a high-level view of a data center that provides an operating environment for a cloud-based services exchange, according to techniques described herein.

FIG. 2 is a block diagram illustrating a high-level view of a data center 201 that provides an operating environment for a cloud-based services exchange 200, according to techniques described herein. Cloud-based services exchange 200 may represent an example implementation of cloud exchange 100 of FIG. 1.

Cloud-based services exchange 200 ("cloud exchange 200") allows a corresponding one of NSP networks 204A-204C and customer networks 204D, 204E (collectively, "'private' or 'carrier' networks 204") of any NSPs 106A-106C or other cloud customers including customers 108A, 108B to be directly connected, via a layer 3 (L3) or layer 2 (L2) connection to any other customer network and/or to any of cloud service providers 110A-110N, thereby allowing exchange of cloud service traffic among the customer networks and/or CSPs 110. Data center 201 may be entirely located within a centralized area, such as a warehouse or localized data center complex, and provide power, cabling, security, and other services to NSPs, customers, and cloud service providers that locate their respective networks within the data center 201 (e.g., for co-location) and/or connect to the data center 201 by one or more external links.

Network service providers 106 may each represent a network service provider that is associated with a transit network by which network subscribers of the NSP 106 may access cloud services offered by CSPs 110 via the cloud exchange 200. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 200.

In this way, cloud exchange 200 streamlines and simplifies the process of partnering CSPs 110 and customers 108 (indirectly via NSPs 106 or directly) in a transparent and neutral manner. One example application of cloud exchange 200 is a co-location and interconnection data center in which CSPs 110, NSPs 106 and/or customers 108 may already have network presence, such as by having one or more accessible ports available for interconnection within the data center. This allows the participating carriers, customers, and CSPs to have a wide range of interconnectivity options in the same facility.

Cloud exchange 200 of data center 201 includes network infrastructure 222 that provides a L2/L3 switching fabric by which CSPs 110 and customers/NSPs interconnect. This enables an NSP/customer to have options to create many-to-many interconnections with only a one-time hook up to the switching network and underlying network infrastructure 222 that presents an interconnection platform for cloud exchange 200. In other words, instead of having to establish separate connections across transit networks to access different cloud service providers or different cloud services of one or more cloud service providers, cloud exchange 200 allows customers to interconnect to multiple CSPs and cloud services using network infrastructure 222 within data center 201, which may represent any of the edge networks described in this disclosure, at least in part.

By using cloud exchange 200, customers can purchase services and reach out to many end users in many different geographical areas without incurring the same expenses typically associated with installing and maintaining multiple virtual connections with multiple CSPs 110. For example, NSP 106A can expand its services using network 204B of NSP 106B. By connecting to cloud exchange 200, an NSP 106 may be able to generate additional revenue by offering to sell its network services to the other carriers. For example, NSP 106C can offer the opportunity to use NSP network 204C to the other NSPs.

Cloud exchange 200 includes an programmable network platform 120 that exposes at least one service interface, which may include in some examples and are alternatively referred to herein as application programming interfaces (APIs) in that the APIs define the methods, fields, and/or other software primitives by which applications may invoke the programmable network platform 120. The software interfaces allow NSPs 106 and customers 108 programmable access to capabilities and assets of the cloud exchange 200. The software interfaces may also allow programmable network platform 120 to obtain information (e.g., telemetry information) from service mesh managers (e.g., istiod) of CSPs 110. For example, service mesh managers may invoke service interface 114 to push telemetry information to programmable network platform 120. The programmable network platform 120 may alternatively be referred to as a controller, provisioning platform, provisioning system, service orchestration system, recommendation system, etc., for establishing end-to-end services including, e.g., connectivity between customers and cloud service providers according to techniques described herein.

On the buyer side, the software interfaces presented by the underlying interconnect platform provide an extensible framework that allows software developers associated with the customers of cloud exchange 200 (e.g., customers 108 and NSPs 106) to create software applications that allow and leverage access to the programmable network platform 120 by which the applications may request that the cloud exchange 200 establish connectivity between the customer and cloud services offered by any of the CSPs 110. For example, these buyer-side software interfaces may allow customer applications for NSPs and enterprise customers, e.g., to obtain authorization to access the cloud exchange, obtain information regarding available cloud services, obtain active ports and metro area details for the customer, create virtual circuits of varying bandwidth to access cloud services, including dynamic selection of bandwidth based on a purchased cloud service to create on-demand and need based virtual circuits to or between cloud service providers, delete virtual circuits, obtain active virtual circuit information, obtain details surrounding CSPs partnered with the cloud exchange provider, obtain customized analytics data, validate partner access to interconnection assets, and assure service delivery.

On the cloud service provider seller side, the software interfaces may allow software developers associated with cloud providers to manage their cloud services and to enable customers to connect to their cloud services. For example, these seller-side software interfaces may allow cloud service provider applications to obtain authorization to access the cloud exchange, obtain information regarding available cloud services, obtain active ports and metro area details for the provider, obtain active port details in a given data center for the provider, approve or reject virtual circuits of varying bandwidth created by customers for the purpose of accessing cloud services, obtain virtual circuits pending addition and confirm addition of virtual circuits, obtain virtual circuits pending deletion and confirm deletion of virtual circuits, obtain customized analytics data, validate partner access to interconnection assets, and assure service delivery.

Service interface 114 facilitates machine-to-machine communication to enable dynamic service provisioning and service delivery assurance. In this way, the programmable network platform 120 enables the automation of aspects of cloud services provisioning. For example, the software interfaces may provide an automated and seamless way for customers to establish, de-install and manage interconnection with or between multiple, different cloud providers participating in the cloud exchange. The programmable network platform 120 may in various examples execute on one or virtual machines and/or real servers of data center 201, or off-site.

In the example of FIG. 2, network infrastructure 222 represents the cloud exchange switching fabric and includes multiple ports that may be dynamically interconnected with virtual circuits by, e.g., invoking service interface 114 of the programmable network platform 120. Each of the ports is associated with one of NSPs 106, customers 108, and CSPs 110.

As described above, cloud service providers 110 may each include a service mesh (e.g., Istio) that represents a network of microservices. For example, CSP 110A includes a service mesh that represents a network of microservices 130. CSP 110A may include a service mesh manager (e.g., istiod) to connect, secure, and manage microservices 130. For example, the service mesh manager may provide a way to control how microservices 130 communicate with each other.

In accordance with the techniques described in this disclosure, service interface 114 may include interfaces (e.g., APIs) to cloud service providers external to data center 201 and/or cloud service providers co-located in data center 201. The interfaces to the cloud service providers may be referred to herein as "external interfaces." As one example, service interface 114 may use the external interfaces to interface with service mesh managers of cloud service providers 110 to obtain telemetry information of the service mesh provided by cloud service providers 110. In this example, service interface 114 may interface with a service mesh manager for CSP 110A to obtain telemetry information for microservices 130. Service interface 114 may also include interfaces to resources internal to data center 201. The interfaces to the cloud exchange may be referred to herein as "internal interfaces." For example, service interface 114 may use the internal interfaces to interface with devices in network infrastructure 222 to obtain telemetry information of the devices in network infrastructure 222, such as the devices used to implement a virtual circuit to connect a customer (e.g., customer 108A) to CSP 110A.

Recommendation engine 122 of programmable network platform 120 may use the telemetry information to determine whether the existing application workload deployment scenario meets the SLO. In response to determining that the existing application workload deployment scenario does not meet the SLO, recommendation engine 122 may determine network connections within cloud exchange 100, and the compute and/or storage nodes provided by cloud service providers that are needed to realize the new application workload deployment scenario and meets the SLO. In this example, recommendation engine 122 may determine that microservices 130 should be migrated to a different cloud service provider, e.g., CSP 110N.

Recommendation engine 122 may provide the customer with a performance-based recommendation including a deployment template specifying information that a service mesh manager may use to deploy the new application workload deployment scenario. For example, recommendation engine 122 may provide customer 108A with a deployment template including Kubernetes-specific attributes to configure compute and/or storage nodes to implement microservices 132 in CSP 110N. The recommendation may also be based on the cost of deploying the new application workload scenario. For example, when generating the recommendation for the new application workload deployment scenario, recommendation engine 122 may take into consideration the budget of the customer and provide the recommendation if the cost to realize the new application workload deployment scenario is within the customer's budget. In some examples, the recommendation for the new application workload deployment scenario includes the cost to realize the new application workload deployment scenario, such as the cost of compute/storage nodes provided by CSP 110N to implement microservices 132 for the new application workload and the cost to instantiate connections between customer 108A and CSP 110N.

Figure 3A:
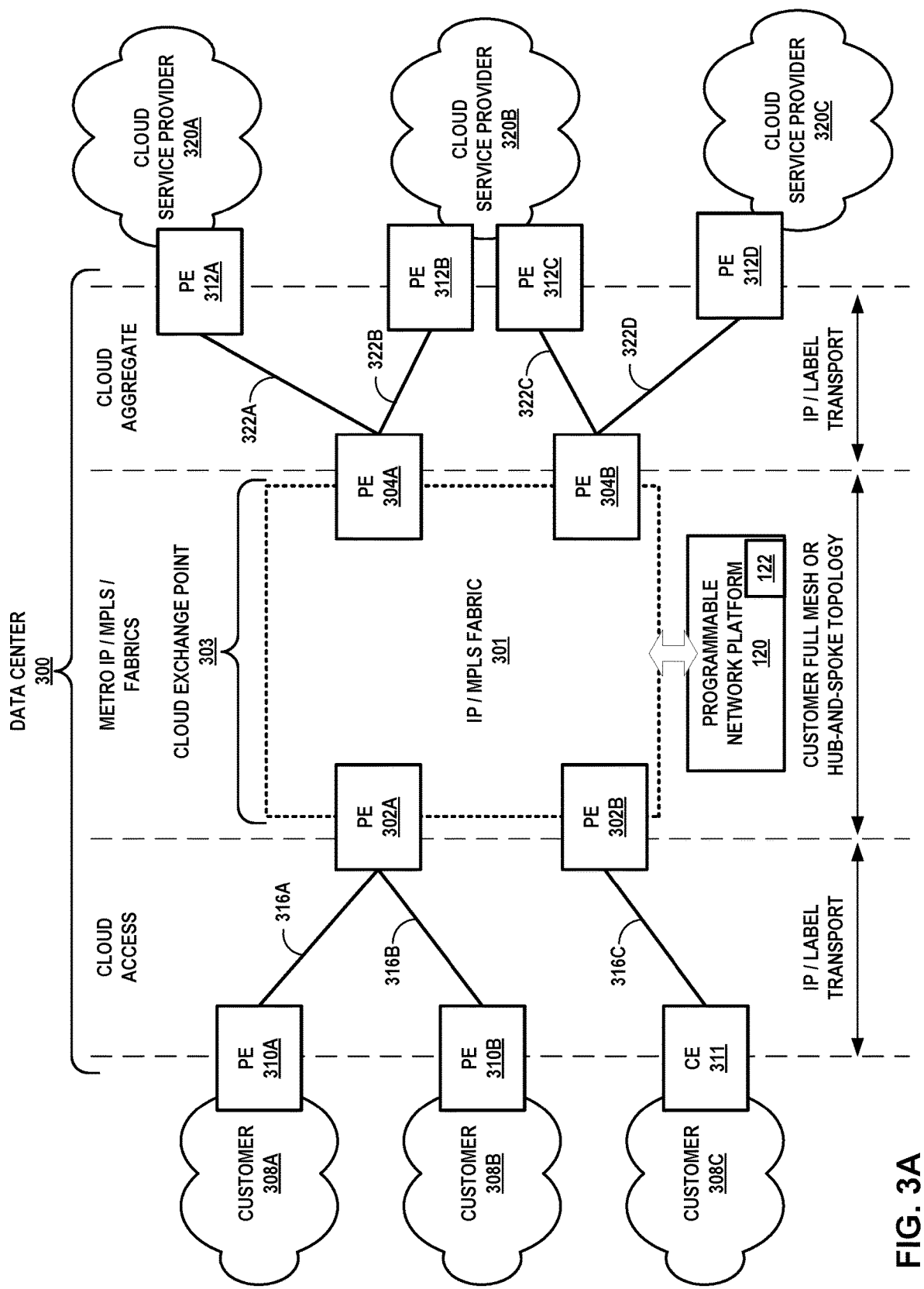
FIGS. 3A-3B are block diagrams illustrating example network infrastructure and service provisioning by a programmable network platform and subscription-based service for a cloud exchange that aggregates the cloud services of multiple cloud service providers for provisioning to customers of the cloud exchange provider and aggregates access for multiple customers to one or more cloud service providers, in accordance with techniques described in this disclosure.
Figure 3B:
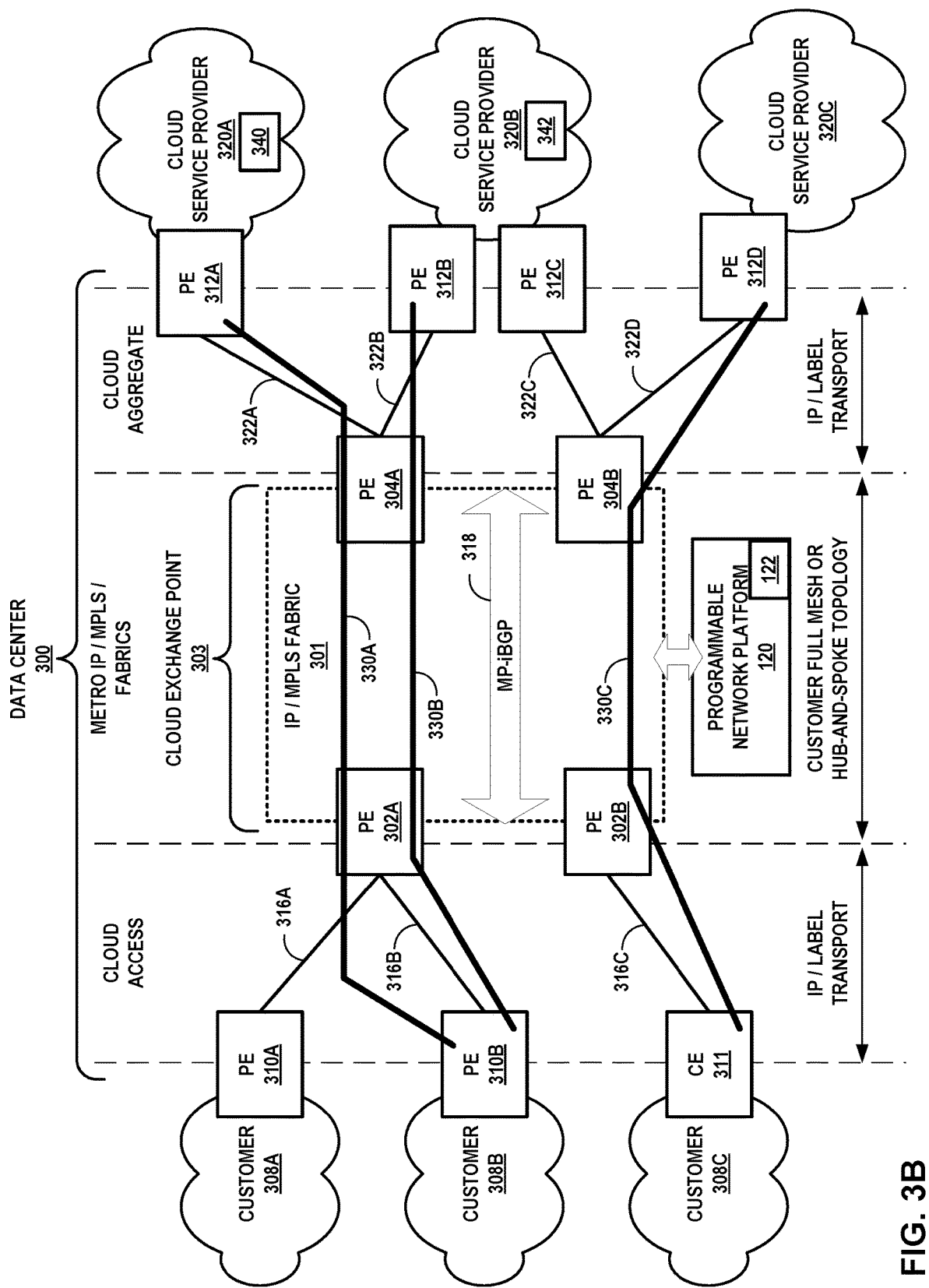

FIGS. 3A-3B are block diagrams illustrating example network infrastructure and service provisioning by a programmable network platform and subscription-based service for a cloud exchange that aggregates the cloud services of multiple cloud service providers for provisioning to customers of the cloud exchange provider and aggregates access for multiple customers to one or more cloud service providers, in accordance with techniques described in this disclosure. In this example, customer networks 308A-308C (collectively, "customer networks 308"), each associated with a different customer, access a cloud exchange point within a data center 300 in order to receive aggregated cloud services from one or more cloud service provider networks 320, each associated with a different cloud service provider 110. In some examples, customer networks 308 each include endpoint devices that consume cloud services provided by cloud service provider network 320. Example endpoint devices include servers, smart phones, television set-top boxes, workstations, laptop/tablet computers, video gaming systems, teleconferencing systems, media players, and so forth.

Customer networks 308A-308B include respective provider edge/autonomous system border routers (PE/ASBRs) 310A-310B. Each of PE/ASBRs 310A, 310B may execute exterior gateway routing protocols to peer with one of PE routers 302A-302B ("PE routers 302" or more simply "PEs 302") over one of access links 316A-316B (collectively, "access links 316"). In the illustrated examples, each of access links 316 represents a transit link between an edge router of a customer network 308 and an edge router (or autonomous system border router) of cloud exchange point 303. For example, PE 310A and PE 302A may directly peer via an exterior gateway protocol, e.g., exterior BGP, to exchange L3 routes over access link 316A and to exchange L3 data traffic between customer network 308A and cloud service provider networks 320. Access links 316 may in some cases represent and alternatively be referred to as attachment circuits for IP-VPNs configured in IP/MPLS fabric 301, as described in further detail below. Access links 316 may in some cases each include a direct physical connection between at least one port of a customer network 308 and at least one port of cloud exchange point 303, with no intervening transit network. Access links 316 may operate over a VLAN or a stacked VLAN (e.g., QinQ), a VxLAN, an LSP, a GRE tunnel, or other type of tunnel.

While illustrated and primarily described with respect to L3 connectivity, PE routers 302 may additionally offer, via access links 316, L2 connectivity between customer networks 308 and cloud service provider networks 320. For example, a port of PE router 302A may be configured with an L2 interface that provides, to customer network 308A, L2 connectivity to cloud service provider 320A via access link 316A, with the cloud service provider 320A router 312A coupled to a port of PE router 304A that is also configured with an L2 interface. The port of PE router 302A may be additionally configured with an L3 interface that provides, to customer network 308A, L3 connectivity to cloud service provider 320B via access links 316A. PE 302A may be configured with multiple L2 and/or L3 sub-interfaces such that customer 308A may be provided, by the cloud exchange provider, with a one-to-many connection to multiple cloud service providers 320.

To create an L2 interconnection between a customer network 308 and a cloud service provider network 320, in some examples, IP/MPLS fabric 301 is configured with an L2 bridge domain (e.g., an L2 virtual private network (L2VPN) such as a virtual private LAN service (VPLS), E-LINE, or E-LAN) to bridge L2 traffic between a customer-facing port of PEs 302 and a CSP-facing port of cloud service providers 320. In some cases, a cloud service provider 320 and customer 308 may have access links to the same PE router 302, 304, which bridges the L2 traffic using the bridge domain.

To create an L3 interconnection between a customer network 308 and a cloud service provider network 320, in some examples, IP/MPLS fabric 301 is configured with L3 virtual routing and forwarding instances (VRFs), as described in further detail below with respect to FIG. 4. In some cases, IP/MPLS fabric 301 may be configured with an L3 instance that includes one or more VRFs, and the L3 instance may link multiple cloud service provider networks 320. In this case, a customer network 308 may not need to be interconnected or have any physical presence in the cloud exchange or data center.

Each of access links 316 and aggregation links 322 may include a network interface device (NID) that connects customer network 308 or cloud service provider 328 to a network link between the NID and one of PE routers 302, 304. Each of access links 316 and aggregation links 322 may represent or include any of a number of different types of links that provide L2 and/or L3 connectivity.

In this example, customer network 308C is not an autonomous system having an autonomous system number. Customer network 308C may represent an enterprise, network service provider, or other customer network that is within the routing footprint of the cloud exchange point. Customer network includes a customer edge (CE) device 311 that may execute exterior gateway routing protocols to peer with PE router 302B over access link 316C. In various examples, any of PEs 310A-310B may alternatively be or otherwise represent CE devices.

Access links 316 include physical links. PE/ASBRs 310A-310B, CE device 311, and PE routers 302A-302B exchange L2/L3 packets via access links 316. In this respect, access links 316 constitute transport links for cloud access via cloud exchange point 303. Cloud exchange point 303 may represent an example of any of cloud exchange points 128. Data center 300 may represent an example of data center 201.

Cloud exchange point 303, in some examples, aggregates customers 308 access to the cloud exchange point 303 and thence to any one or more cloud service providers 320. FIGS. 3A-3B, e.g., illustrate access links 316A-316B connecting respective customer networks 308A-308B to PE router 302A of cloud exchange point 303 and access link 316C connecting customer network 308C to PE router 302B. Any one or more of PE routers 302, 304 may comprise ASBRs. PE routers 302, 304 and IP/MPLS fabric 301 may be configured according to techniques described herein to interconnect any of access links 316 to any of cloud aggregation links 322. As a result, cloud service provider network 320A, e.g., needs only to have configured a single cloud aggregate link (here, access link 322A) in order to provide services to multiple customer networks 308. That is, the cloud service provider operating cloud service provider network 302A does not need to provision and configure separate service links from cloud service provider network 302A to each of PE routers 310, 311, for instance, in order to provide services to each of customer network 308. Cloud exchange point 303 may instead connect cloud aggregation link 322A and PE 312A of cloud service provider network 320A to multiple cloud access links 316 to provide layer 3 peering and network reachability for the cloud services delivery.

In addition, a single customer network, e.g., customer network 308A, need only to have configured a single cloud access link (here, access link 316A) to the cloud exchange point 303 within data center 300 in order to obtain services from multiple cloud service provider networks 320 offering cloud services via the cloud exchange point 303. That is, the customer or network service provider operating customer network 308A does not need to provision and configure separate service links connecting customer network 308A to different PE routers 312, for instance, in order to obtain services from multiple cloud service provider networks 320. Cloud exchange point 303 may instead connect cloud access link 316A (again, as one example) to multiple cloud aggregate links 322 to provide layer 3 peering and network reachability for the cloud services delivery to customer network 308A.

Cloud service provider networks 320 each includes servers configured to provide one or more cloud services to users. These services may be categorized according to service types, which may include for examples, applications/software, platforms, infrastructure, virtualization, and servers and data storage. Example cloud services may include content/media delivery, cloud-based storage, cloud computing, online gaming, IT services, etc.

Cloud service provider networks 320 include PE routers 312A-312D that each executes an exterior gateway routing protocol, e.g., eBGP, to exchange routes with PE routers 304A-304B (collectively, "PE routers 304") of cloud exchange point 303. Each of cloud service provider networks 320 may represent a public, private, or hybrid cloud. Each of cloud service provider networks 320 may have an assigned autonomous system number or be part of the autonomous system footprint of cloud exchange point 303.

In the illustrated example, an Internet Protocol/Multiprotocol label switching (IP/MPLS) fabric 301 interconnects PEs 302 and PEs 304. IP/MPLS fabric 301 include one or more switching and routing devices, including PEs 302, 304, that provide IP/MPLS switching and routing of IP packets to form an IP backbone. In some example, IP/MPLS fabric 301 may implement one or more different tunneling protocols (i.e., other than MPLS) to route traffic among PE routers and/or associate the traffic with different IP-VPNs. In accordance with techniques described herein, IP/MPLS fabric 301 implement IP virtual private networks (IP-VPNs) to connect any of customers 308 with multiple cloud service provider networks 320 to provide a data center-based 'transport' and layer 3 connection.

Whereas service provider-based IP backbone networks require wide-area network (WAN) connections with limited bandwidth to transport service traffic from layer 3 services providers to customers, the cloud exchange point 303 as described herein 'transports' service traffic and connects cloud service providers 320 to customers 308 within the high-bandwidth local environment of data center 300 provided by a data center-based IP/MPLS fabric 301. In some examples, IP/MPLS fabric 301 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein. In some example configurations, a customer network 308 and cloud service provider network 320 may connect via respective links to the same PE router of IP/MPLS fabric 301.

Access links 316 and aggregation links 322 may include attachment circuits that associate traffic, exchanged with the connected customer network 308 or cloud service provider network 320, with virtual routing and forwarding instances (VRFs) configured in PEs 302, 304 and corresponding to IP-VPNs operating over IP/MPLS fabric 301. For example, PE 302A may exchange IP packets with PE 310A on a bidirectional label-switched path (LSP) operating over access link 316A, the LSP being an attachment circuit for a VRF configured in PE 302A. As another example, PE 304A may exchange IP packets with PE 312A on a bidirectional label-switched path (LSP) operating over access link 322A, the LSP being an attachment circuit for a VRF configured in PE 304A. Each VRF may include or represent a different routing and forwarding table with distinct routes.

PE routers 302, 304 of IP/MPLS fabric 301 may be configured in respective hub-and-spoke arrangements for cloud services, with PEs 304 implementing cloud service hubs and PEs 302 being configured as spokes of the hubs (for various hub-and-spoke instances/arrangements). A hub-and-spoke arrangement ensures that service traffic is enabled to flow between a hub PE and any of the spoke PEs, but not directly between different spoke PEs. As described further below, in a hub-and-spoke arrangement for data center-based IP/MPLS fabric 301 and for southbound service traffic (i.e., from a CSP to a customer) PEs 302 advertise routes, received from PEs 310, to PEs 304, which advertise the routes to PEs 312. For northbound service traffic (i.e., from a customer to a CSP), PEs 304 advertise routes, received from PEs 312, to PEs 302, which advertise the routes to PEs 310.

For some customers of cloud exchange point 303, the cloud exchange point 303 provider may configure a full mesh arrangement whereby a set of PEs 302, 304 each couple to a different customer site network for the customer. In such cases, the IP/MPLS fabric 301 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3 VPN.

PE routers may couple to one another according to a peer model without use of overlay networks. That is, PEs 310 and PEs 312 may not peer directly with one another to exchange routes, but rather indirectly exchange routes via IP/MPLS fabric 301. In the example of FIG. 3B, cloud exchange point 303 is configured to implement multiple layer 3 virtual circuits 330A-330C (collectively, "virtual circuits 330") to interconnect customer network 308 and cloud service provider networks 322 with end-to-end IP paths. Each of cloud service providers 320 and customers 308 may be an endpoint for multiple virtual circuits 330, with multiple virtual circuits 330 traversing one or more attachment circuits between a PE/PE or PE/CE pair for the IP/MPLS fabric 301 and the CSP/customer. A virtual circuit 330 represents a layer 3 path through IP/MPLS fabric 301 between an attachment circuit connecting a customer network to the fabric 301 and an attachment circuit connecting a cloud service provider network to the fabric 301. Each virtual circuit 330 may include at least one tunnel (e.g., an LSP and/or Generic Route Encapsulation (GRE) tunnel) having endpoints at PEs 302, 304. PEs 302, 304 may establish a full mesh of tunnels interconnecting one another.

Each virtual circuit 330 may include a different hub-and-spoke network configured in IP/MPLS network 301 having PE routers 302, 304 exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual circuit 330A, PE router 312A of cloud service provider network 320A may send a route for cloud service provider network 320A to PE 304A via a routing protocol (e.g., eBGP) peering connection with PE 304A. PE 304A associates the route with a hub-and-spoke network, which may have an associated VRF, that includes spoke PE router 302A. PE 304A then exports the route to PE router 302A; PE router 304A may export the route specifying PE router 304A as the next hop router, along with a label identifying the hub-and-spoke network. PE router 302A sends the route to PE router 310B via a routing protocol connection with PE 310B. PE router 302A may send the route after adding an autonomous system number of the cloud exchange point 303 (e.g., to a BGP autonomous system path (AS PATH) attribute) and specifying PE router 302A as the next hop router. Cloud exchange point 303 is thus an autonomous system "hop" in the path of the autonomous systems from customers 308 to cloud service providers 320 (and vice-versa), even though the cloud exchange point 303 may be based within a data center. PE router 310B installs the route to a routing database, such as a BGP routing information base (RIB) to provide layer 3 reachability to cloud service provider network 320A. In this way, cloud exchange point 303 "leaks" routes from cloud service provider networks 320 to customer networks 308, without cloud service provider networks 320 to customer networks 308 requiring a direct layer peering connection.

PE routers 310B, 302A, 304A, and 312A may perform a similar operation in the reverse direction to forward routes originated by customer network 308B to PE 312A and thus provide connectivity from cloud service provider network 320A to customer network 308B. In the example of virtual circuit 330B, PE routers 312B, 304A, 302A, and 310B exchange routes for customer network 308B and cloud service provider 320B in a manner similar to that described above for establishing virtual circuit 330B. As a result, cloud exchange point 303 within data center 300 internalizes the peering connections that would otherwise be established between PE 310B and each of PEs 312A, 312B so as to perform cloud aggregation for multiple layer 3 cloud services provided by different cloud service provider networks 320A, 320B and deliver the multiple, aggregated layer 3 cloud services to a customer network 308B having a single access link 316B to the cloud exchange point 303.

Absent the techniques described herein, fully interconnecting customer networks 308 and cloud service provider networks 320 would require 3×3 peering connections between each of PEs 310 and at least one of PEs 312 for each of cloud service provider networks 320. For instance, PE 310A would require a layer 3 peering connection with each of PEs 312. With the techniques described herein, cloud exchange point 303 may fully interconnect customer networks 308 and cloud service provider networks 320 with one peering connection per site PE (i.e., for each of PEs 310 and PEs 312) by internalizing the layer 3 peering and providing data center-based 'transport' between cloud access and cloud aggregate interfaces.

In examples in which IP/MPLS fabric 301 implements BGP/MPLS IP VPNs or other IP-VPNs that use route targets to control route distribution within the IP backbone, PEs 304 may be configured to import routes from PEs 302 and to export routes received from PEs 312, using different asymmetric route targets. Likewise, PEs 302 may be configured to import routes from PEs 304 and to export routes received from PEs 310 using the asymmetric route targets. Thus, PEs 302, 304 may configured to implement advanced L3VPNs that each includes a basic backbone L3VPN of IP/MPLS fabric 301 together with extranets of any of customer networks 308 and any of cloud service provider networks 320 attached to the basic backbone L3VPN.

Each advanced L3VPN constitutes a cloud service delivery network from a cloud service provider network 320 to one or more customer networks 308, and vice-versa. In this way, cloud exchange point 303 enables any cloud service provider network 320 to exchange cloud service traffic with any customer network 308 while internalizing the layer 3 routing protocol peering connections that would otherwise be established between pairs of customer networks 308 and cloud service provider networks 320 for any cloud service connection between a given pair. In other words, the cloud exchange point 303 allows each of customer networks 308 and cloud service provider networks 320 to establish a single (or more for redundancy or other reasons) layer 3 routing protocol peering connection to the data center-based layer 3 connect. By filtering routes from cloud service provider networks 320 to customer networks 308, and vice-versa, PEs 302, 304 thereby control the establishment of virtual circuits 330 and the flow of associated cloud service traffic between customer networks 308 and cloud service provider networks 320 within a data center 300. Routes distributed into MP-iBGP mesh 318 may be VPN-IPv4 routes and be associated with route distinguishers to distinguish routes from different sites having overlapping address spaces.

Programmable network platform 120 may receive service requests for creating, reading, updating, and/or deleting end-to-end services of the cloud exchange point 303. In response, programmable network platform 120 may configure PEs 302, 304 and/or other network infrastructure of IP/MPLS fabric 301 to provision or obtain performance or other operations information regarding the service. Operations for provisioning a service and performed by programmable network platform 120 may include configuring or updating VRFs, installing SDN forwarding information, configuring LSPs or other tunnels, configuring BGP, configuring access links 316 and aggregation links 322, or otherwise modifying the configuration of the IP/MPLS fabric 301. Other operations may include making service requests to an orchestration system for cloud service provider networks 320, as described in further detail below.

In accordance with the techniques described in this disclosure, programmable network platform 120 includes a recommendation engine 122 that provides performance-based recommendation for new application workload deployment scenarios. As described in this disclosure, cloud service providers 320 include service meshes to implement microservices. Recommendation engine 122 may determine, based on telemetry information obtained from the cloud service providers 320 and telemetry information obtained from cloud exchange point 303, whether an existing application workload deployment scenario meets the SLO. For example, the existing application workload deployment scenario may implement microservices 340 in cloud service provider 320A and virtual circuit 330A to connect customer 308B to cloud service provider 320A. Programmable network platform 120 may use an external interface to interface with a service mesh manager of cloud service provider 320A to obtain telemetry information of the service mesh implementing microservices 340. Programmable network platform 120 may use an internal interface to interface with cloud exchange point 303 to obtain telemetry information of network devices and links used to implement virtual circuit 330A. For example, programmable network platform 120 may obtain telemetry information such as latency, jitter, packet loss, etc. from PE 310B, access link 316B, PE 302A, PE 304A, aggregation link 322A, and PE 312A. Based on the telemetry information, recommendation engine 122 determines whether the performance of microservices 340 and virtual circuit 330A meet the SLO. In response to determining that the existing application workload deployment scenario does not meet the SLO, recommendation engine 122 may determine network connections within cloud exchange 100, and the compute and/or storage nodes provided by cloud service providers that are needed to realize the new application workload deployment scenario that meets the SLO.

Recommendation engine 122 may provide customer 308B with a performance-based recommendation including a deployment template specifying information from which a service mesh manager of cloud service provider 320B may use to deploy the new application workload deployment scenario. For example, recommendation engine 122 may provide customer 308B with a deployment template including Kubernetes-specific attributes to configure compute and/or storage nodes to implement microservices 342 in CSP 320B. The recommendation may also be based on the cost of deploying the new application workload scenario. For example, when generating the recommendation for the new application workload deployment scenario, recommendation engine 122 may take into consideration the budget of the customer and provide the recommendation if the cost to realize the new application workload deployment scenario is within the customer's budget. In some examples, the recommendation for the new application workload deployment scenario includes the cost to realize the new application workload deployment scenario, such as the cost of compute/storage nodes provided by cloud service provider 320B to implement microservices 342 for the new application workload and the cost to instantiate virtual circuit 330B (which meets the performance objective) between customer 308B and CSP 320B.

In some examples, programmable network platform 120 may in response to determining that the existing application workload does not meet the performance objective, configure cloud exchange 100 to realize the new application workload deployment scenario. For example, in response to determining that microservices 340 does not meet the performance objective, recommendation engine 122 may cause programmable network platform 120 to dynamically configure within fabric 301 of cloud exchange 100, for instance, virtual circuit 330B for cloud-based services delivery from CSP 320B to cloud customer 302A.

Because the telemetry information includes telemetry information about the cloud exchange fabric 301, including metrics for the network paths between PE 302A and 304A, the recommendation engine 122 can incorporate more factors into the SLO comparison than are provided by the CSPs 320 themselves. These additional factors can change the balance of the determination in favor of deployment of a portion of the application workload to, e.g., CSP 320B instead of CSP 320A.

For example, customer 308B may be co-located within a data center that is geographically closer, or has higher bandwidth connectivity, to cloud service provider 320B than to cloud service provider 320A (colocation not shown in FIGS. 3A-3B). As another example, customer 308B and cloud service provider 320B may be co-located within the same data center, while cloud service provider 320A is not co-located within that data center. Network metrics and costs may differ significantly from each customer 308 to different CSPs 320, and the network metrics and costs can vary over time.

Accordingly, the SLO evaluation may be based on a comparison of end-to-end service level indicators for application traffic between workloads that is neutral for CSPs 320 and that may be based, at least in part, on service level indicators for application traffic among a mesh of different cloud providers and traversing the overall cloud exchange network that includes, in this example, fabric 301.

Figure 4:
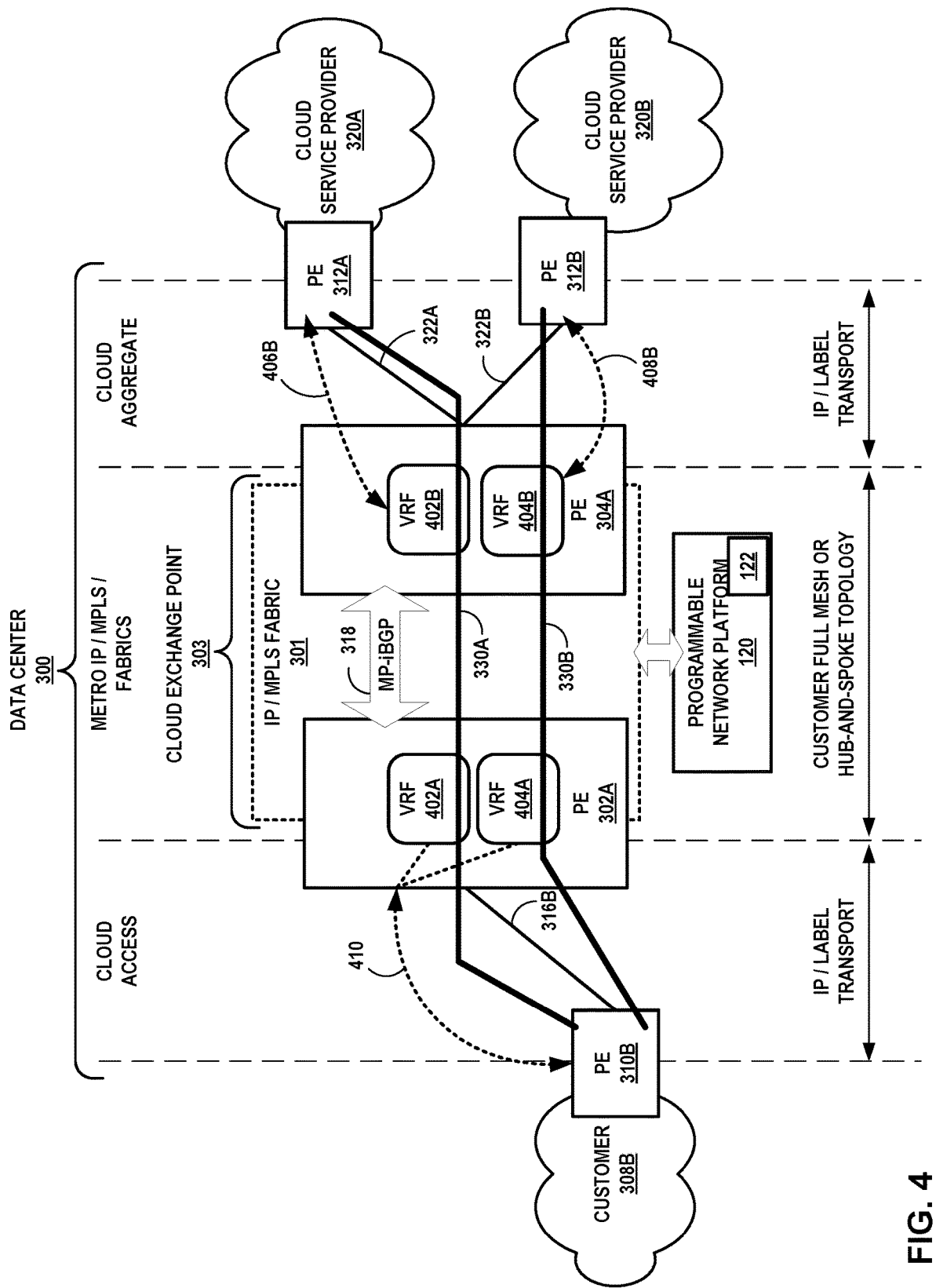
FIG. 4 is a block diagram illustrating an example of a data center-based cloud exchange point in which routers of the cloud exchange point are configured by programmable network platform with VPN routing and forwarding instances for routing and forwarding aggregated service traffic from multiple cloud service provider networks to a customer network, according to techniques described herein.

FIG. 4 is a block diagram illustrating an example of a data center-based cloud exchange point in which routers of the cloud exchange point are configured by programmable network platform 120 with VPN routing and forwarding instances for routing and forwarding aggregated service traffic from multiple cloud service provider networks to a customer network, according to techniques described herein. In this example, to establish virtual circuits 330A-330B, PE routers 302A and 304A of IP/MPLS fabric 301 are configured with VRFs. PE 302A is configured with VRFs 402A and 404A, while PE 304A is configured with VRFs 402B and 404B. VRF 402A is configured to import routes exported by VRF 402B, and VRF 402B is configured to import routes exported by VRF 402A. The configuration may include asymmetric route targets for import/export between VRFs 402A, 402B. VRF 404A is configured to import routes exported by VRF 404B, and VRF 404B is configured to import routes exported by VRF 404A. The configuration may include asymmetric route targets for import/export between VRFs 402A, 402B. This configuration whereby a customer can access multiple layer 3 services from different CSPs each associated with separate VRFs to access the layer 3 services provides isolation of respective traffic exchanged with the CSPs. In some examples, PE 302A may be configured with a single VRF to import routes exported by both VRF 402B and VRF 404B. As noted above with respect to FIGS. 3A-3B, PEs 302, 304 may be further configured to bridge layer 2 traffic between customer 308B and cloud service providers 320.

In this example, PE 304A operates BGP or other route distribution protocol peering connections 406B, 408B with respective PEs 312A, 312B to exchange routes with respective cloud service provider networks 320A, 320B. PE 302A operates a BGP or other route distribution protocol peering connection 410 with PE 310B to exchange routes with customer network 308B. In some examples, PEs 302A, 304A may be statically configured with routes for the site networks.

An administrator or a programmable network platform described herein for cloud exchange point 303 may configure PEs 302A, 304A with the VRF 402A-402B, 404A-404B in order to leak routes between PEs 312 and PE 310B and facilitate layer 3 connectivity for end-to-end IP paths illustrated here by virtual circuits 330, while potentially optimizing the end-to-end IP paths by fostering data center-based or at least metro-based connectivity. Cloud exchange point 303 may thus provide dedicated cloud service provider access to customer network 308B by way of private and/or public routes for the cloud service provider networks 320. In the northbound direction, cloud exchange point 303 may provide dedicated cloud service provider distribution to multiple customer networks 308 by way of private and/or public routes for the customer networks 308. Neither PE 310B nor any of PEs 302A, 304A need access to the full Internet BGP routing table to reach cloud service provider networks 320 or customer networks 308. Moreover, PEs 302A, 304A may be configured to aggregate customer/CSP routes and/or service traffic based on any one or more of physical, IP, service, and VRFs.

Figure 5:
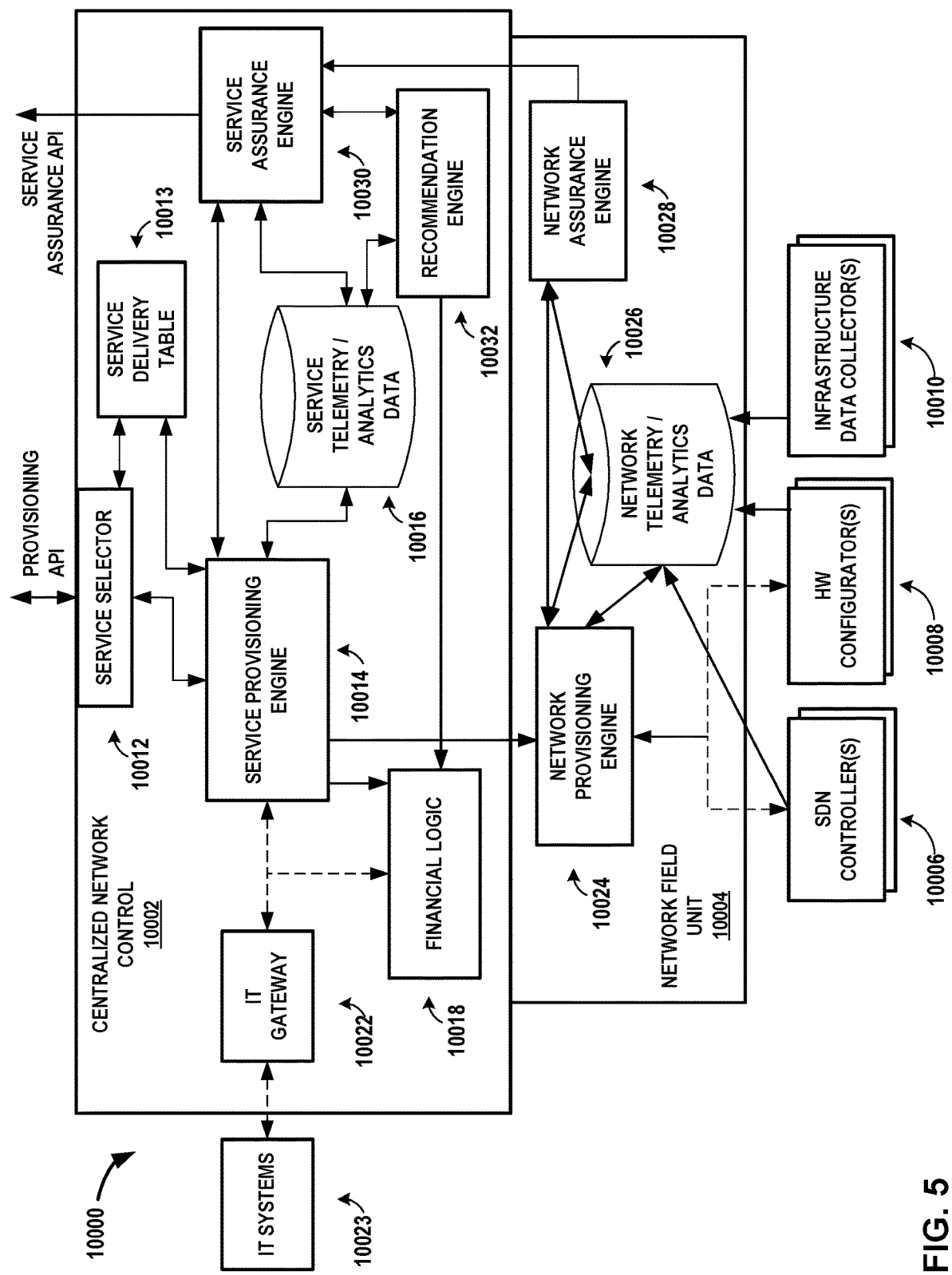
FIG. 5 is a block diagram illustrating a platform for a software-controlled network, the platform operating in accordance with one or more techniques of the present disclosure.

FIG. 5 is a block diagram illustrating a platform for a software controlled network, the platform operating in accordance with one or more techniques of the present disclosure. FIG. 5 illustrates a programmable network platform 10000 that includes multiple components, which collectively provide for dynamic configuration and management of a cloud-based services exchange, or "cloud exchange." These components may provide virtual connections for cloud services delivery from multiple cloud service providers to one or more cloud customers. Programmable network platform 10000 includes centralized network control (CNC) system 10002, one or more network field units (NFUs) 10004, software-defined networking (SDN) controller 10006, hardware configurators 10008, infrastructure data collectors 10010, and information technology systems (10023).

Programmable network platform 10000 may provide for the orchestration of a service across multiple cloud service providers and allow one of the cloud service providers to be the service owner in terms of the service monitoring, assurance and billing. Programmable network platform 10000 may provide the process and apparatus for multiple cloud service provider orchestration system to securely communicate with each other to deliver a combined service on demand in a single-click manner. Programmable network platform 10000 may represent an example instance of programmable network platform 120 or another programmable network platform, controller, or system described herein for provisioning services and assuring service delivery.

In the example of FIG. 5, CNC system 10002 enables the automation of aspects of cloud services provisioning. As such, CNC system 10002 may provide one or more software interfaces that allow customers to establish, de-install and manage interconnections with multiple, different cloud providers participating in the cloud exchange in an automated and seamless manner. CNC system 10002 may include logic to receive a business service request via an API call and convert that into the necessary business instantiation parameters and network provisioning parameters to be delivered and assured as a business service. CNC system 10002 may be the central intelligent processing unit of the orchestration system (e.g., programmable network platform 10000) and there may be one logical instance of this intelligent logic present per instantiation. CNC system 10002 also has the capability of communicating with a third-party orchestration system if needed by the service request. For example, CNC system 10002 may communicate with a daemon of a service mesh provided by a cloud service provider. CNC system 10002 may provide service assurance using a Monitor, Analyze, Plan and Execute (MAPE) loop methodology and is implemented to ensure the service level agreements are adhered to by the service.

In some examples, NFU 10004 is implemented as a self-contained unit that receives requests or instructions from CNC system 10002 to configure network infrastructure of a cloud exchange point for one or more services. For instance, NFU 10004 may comprise a combination of hardware and software. In some examples, NFU 10004 may be a virtual machine. In any case, NFU 10004 receives requests or instructions from CNC system 10002 based on customer requests submitted to CNC system 10002. As further described below, NFU 10004 may determine whether sufficient resources exist to provide the services requested by CNC system 10002. If sufficient resources exist, NFU 10004 may communicate or otherwise interoperate with SDN controller 10006, hardware configurators 10008, and infrastructure data collectors 10010 to configure the network infrastructure to provide the requested service. NFU 10004 may represent a globally distributed intelligent logical unit that receives network instantiation commands from CNC system 10002 and instantiates and configures the network resource that is needed to deliver the service. NFU 10004 may have the intelligence to deliver and assure network services as per the request of CNC system 10002. NFU 10004 may have its own MAPE loop to ensure that the network services delivered by the unit is assured for the life cycle of the service.

In some examples, multiple cloud exchange points may be geographically dispersed. Each geographically positioned cloud exchange point may have a corresponding NFU that is geographically positioned at the same location as the respective cloud exchange point. The corresponding NFU may configure and otherwise manage the network infrastructure of the particular geographically-positioned cloud exchange point. In this way, a particular NFU may receive requests or instructions from CNC system 10002 and configure the network infrastructure of the cloud exchange point that is managed by the particular NFU. In some cases, multiple cloud exchange points of a metropolitan area make up a metro-based cloud exchange managed by a single NFU.

NFU 10004 may therefore represent the distributed processing unit of programmable network platform 10000, which provides programmable network platform 10000 with the ability to horizontally scale and deliver and assure services. NFU 10004 is the component of programmable network platform 10000 that may provide the functionality of delivering the services in a vendor agnostic and form factor agnostic manner. As shown in FIG. 5, NFU 10004 has several software components that enable the distributed processing unit to deliver the services.

In order to provision services and virtual connections to cloud customers and cloud service providers, CNC system 10002 includes a service selector 10012. In some examples, service selector 10012 may operate as an API gateway. For example, service selector 10012 may expose software interfaces defined according to one or more APIs. Requests and/or instructions received by service selector 10012 may be include the form of create, read, update, and/or delete (CRUD) requests made with respect to services provided by and/or delivered by the cloud exchange. Applications may invoke endpoints of the APIs provided by service selector 10012, which may in turn invoke service provisioning engine 10014. Service selector 10012 may execute on one or virtual machines and/or real servers, for instance. Although shown as a single element in FIG. 5, service selector 10012 may comprise a cluster of one or more physical and/or virtual computing machines executing on one or more physical processors. In some aspects, service selector 10012 provides a service catalog that describes available services and providers for the available services. Service selector 10012 may query service delivery table 10013 to determine the routes that correspond to each service. Service selector 10012 may provide the route-service mappings to service provisioning engine 10014.

Service provisioning engine 10014 may receive requests to provision services from service selector 10012. Service provisioning engine 10014, in conjunction with network field unit 10004, organizes, directs and integrates underlying hardware and software sub-systems for managing various aspects of service provisioning within the network infrastructure as well as cloud services management. For instance, service provisioning engine 10014 may provide a rule-driven workflow engine that operates between service selector 10012 and the underlying interconnect platform of a cloud exchange that is configured by network field unit 10004. In this way, service provisioning engine 10014 can be invoked via service selector 10012 by customer-proprietary applications, a cloud provider-based customer portal, and/or cloud service provider systems, for direct participation with the programmable network platform of a cloud exchange network infrastructure that is configured by network field unit 10004. Service provisioning engine 10014 may include a third-party service connector that communicates with the third-party orchestration systems to ensure that the service is adequately networked together to provide the end-to-end cloud-based service fulfillment. As further described below, NFU 10004 may receive instructions and/or requests from CNC system 10002, which NFU 10004 uses to provision services at one or more cloud exchange points.

Service provisioning engine 10014 may query and store service telemetry and analytics data (STAD) 10016 in one or more data stores. STAD 10016 may include metrics about the quantity, type, definition, and consumers of services that are configured by service provisioning engine 10014. STAD 10016 may include analytics information based on raw metrics data from NFU 10004. For instance, analysis information of STAD 10016 may include historical statistics and/or real-time statistics, which may be analyzed on various dimensions, such as consumer, service type, service use, to name only a few examples.

CNC system 10002 may also include financial logic 10018. Financial logic 10018 may store accounting information for customers. For instance, financial logic 10018 may store billing information for customers, such as name, address, phone number, email, to name only a few examples. When service provisioning engine 10014 configures a service for a customer that includes a service charge, financial logic 10018 may also store such expense information such as budget or cost preference. In some examples, a customer may indicate whether the recommendation should be cost-focused or performance-focused, as further described in FIG. 6 below. In this way, financial logic 10018 may provide an accounting of services purchased by a customer and provide billing and budget for such services.

CNC system 10002 may include Information Technology (IT) gateway 10022 that interfaces with IT systems 10023. IT systems 10023 may include one or more computing devices, such as desktop computers, tablets, smartphones, and servers, to name only a few examples. IT systems 10023 may provide one or more user interfaces to administrators, which may use IT systems 10023 to administer CNC system 10002. IT systems 10023 may, for example, receive user inputs to configure CNC system 10002 and/or NFU 10004. Based on the user inputs, IT systems 10023 may send requests and/or instructions to CNC system 10002, which are received by IT gateway 10022. In some examples, CNC system 10002 may provide or otherwise expose one or more RESTful interfaces that can be called or otherwise invoked by IT systems 10023. IT gateway 10022 may route such instructions or requests to other components within CNC system 10002 for further processing based on the type of requests and/or instructions.

In some examples, CNC 10002 may contain service delivery table 10013 that stores data indicating a correspondence between routes and services offered by cloud service providers. Service delivery table 10013 may include customer service selections that indicate customer preferences for the cloud exchange. Service selector 10012 and service provisioning engine 10014 may use information from service delivery table 10013 to determine which services to advertise or deliver to the customer, or to determine a manner of advertising the services to the customer (e.g., whether to add a higher administrative cost to the route for the advertised service).

As described above, NFU 10004 may receive requests or instructions from CNC system 10002 to provision one or more services. Network provisioning engine 10024 may receive the requests and/or instructions from service provisioning engine 10014. Network provisioning engine 10024 may determine whether sufficient resources exist to satisfy a request for a service to be configured at a cloud exchange point. In some examples, network provisioning engine 10024 may query one or more components such as SDN controller 10006, hardware configurators 10008, and/or network telemetry and analytics data (NTAD) 10026. If sufficient resources exist to provision a requested service, network provisioning engine 10024 may send instructions and/or requests to one or more of SDN controller 10006 and/or hardware configurators 10008 that cause each respective component to be configured to provision the requested service. As such, network provisioning engine 10024 provides the functionality of selecting the vendor, and form factor in which the service is delivered. Network provisioning engine 10024 also provides the policy manager functionality to ensure the service is delivered in the correct order of operations.

In some examples, network provisioning engine 10024 of NFU 10004 may include a Network Appliance Sizing Engine (not shown) that provides the functionality of ensuring the network appliance is properly sized for the appropriate SLA to be delivered by the appliance. In some examples, NFU 10004 may include a Device Selection and Handler (not shown) that provides the functionality of selecting the correct device to deliver the service, and convert the network commands to the appropriate configuration commands for the selected device. For example NFU 10004 may access a list that describes the capabilities of virtual and/or dedicated appliances within the cloud exchange for providing native services, such as firewall (FW), network address translation (NAT), and deep-packet inspection (DPI), to service traffic traversing the cloud exchange. NFU 10004 may select a device from the list to satisfy the service request.

Network provisioning engine 10024 may query and store network telemetry and analytics data (NTAD) 10026 in one or more data stores. NTAD 10026 may include metrics about the quantity, type, definition, of network and resource configurations that are configured by NFU 10004. NTAD 10026 may include analytics information from infrastructure data collectors 10010 based on raw metrics data for resources used in a particular service. For instance, analysis information of NTAD 10026 may include historical statistics and/or real-time statistics.

As shown in FIG. 5, one or more SDN controllers 10006 may configure network resources, such as routers, switches, bridges, and the like, which provide the physical infrastructure to carry network traffic through a cloud exchange point. One or more hardware configurators 10008 may configure hardware resources, such as servers or the above-mentioned network resources; resources within servers and network resources including processor allocation, memory allocation; storage appliances; other hardware resources; and software configurations that may be configured to provision services to a customer. One or more infrastructure data collectors 10010 may collect metrics about the quantity, type, definition, of network and resource configurations that are configured by NFU 10004. For instance, infrastructure data collectors 10010 may monitor and measure metrics of network resources and any other resources configured to provision services to a customer. Infrastructure data collectors 10010 may store such metrics in NTAD 10026.

NFU 10004 and CNC system 10002 may include network assurance engine 10028 and service assurance engine 10030, respectively. Network assurance engine 10028 may determine, based on NTAD 10026, whether infrastructure configured to provide services is providing a satisfactory level of service. For example, outages, resource consumption overages, hardware and/or software failures or problems, and other events may affect the quality of services provided by the network infrastructure at a cloud exchange point. Network assurance engine 10028 may monitor NTAD 10026, and in some cases, send information to service assurance engine 10030. In some examples, the information may include alerts if service levels are not being met, or more specifically alerts for outages, resource consumption overages, hardware and/or software failures or problems. In some examples, information sent by network assurance engine 10028 to service assurance engine 10030 may be informational rather than based on a specific event. For instance, network assurance engine 10028 may send information about the performance of infrastructure to service assurance engine on a particular schedule or interval, and/or on continuous or real-time basis. In some examples NTAD 10026 may contain a set of structured and/or unstructured databases that enable the service provisioning engine 10014 and network assurance engine 10028 to appropriately store and retrieve data to support the operation of programmable network platform 10000.

Network assurance engine 10028 may provide the functionality of assuring the network configuration created is assured as per the networking SLAs requested by CNC system 10002. The Network Assurance Engine is comprised of several sub-components that deliver the assurance through a MAPE loop including: (1) Monitoring, which is performed by several data collectors that are programmed to monitor and gather data for a given service; (2) Analyzing, which analyzes the data collected by the data collectors to compare and ensure that the services are compliant with the requested SLAs (3) Planning, which in the event a service or set of services are out of compliance, a planning module will make the decisions if the current non-compliance can be mitigated locally or needs to escalated to the CNC system 10002 for further processing; and (4) Executing, which is based on the decisions taken by the planning module to execute actions in the event the non-compliance can be locally mitigated.

Service assurance engine 10030 may receive information from network assurance engine 10028 and may compare the information with service level information, such as service level agreements, included in STAR 10016. By comparing information about the performance of infrastructure with service level information in STAR 10016, service assurance engine may send service level information to customers using one or more service assurance APIs, and whether such service level agreements are being met. In this way, customers may monitor or otherwise evaluate the quality of service provided by one or more cloud exchange points. In this example, service assurance engine 10030 may also obtain telemetry information from service meshes provided by cloud service providers. As one example, service assurance engine 10032 may use one or more service assurance APIs to interface with service mesh managers of cloud service providers. As one particular example, cloud service providers may have a service mesh (e.g., Istio) and service assurance engine may use Istio APIs to interface with a daemon (istiod) of a respective service mesh to obtain telemetry information about the service mesh. Service assurance engine 10030 may store the telemetry information obtained from the cloud service providers in STAR 10016. As described below, recommendation engine 10032 may access STAR 10016 to determine the performance of existing application workloads meet service level objectives and to provide performance-based recommendations for application workload deployment scenarios if the existing application workloads do not meet the service level objectives.

As described above, programmable network platform 10000 may bridge business systems, such as customers and cloud service providers, with operations systems, such as the network infrastructure of one or more cloud exchange points to improve operational efficiency. As such, programmable network platform 10000 may provide improved visibility to monitor and assure the end-to-end service and its components. Accordingly, programmable network platform 10000, unlike conventional systems may include the capability to perform the provisioning and assurance of services across multiple orchestration systems for multiple cloud providers. CNC system 10002 may operate as the master controller that performs the function of receiving a service request that encapsulates the business requirements for the service, and using business, network and partner sub-system logic to instantiate and assure the service. As shown in FIG. 5, CNC system 10002 is made up of multiple different software modules performing different functions of fulfilling a service request. Programmable network platform 10000 may provide a distributed orchestration system for creating services and distributing the intelligence of delivering and assuring services. Additionally, programmable network platform 10000 may provide a distributed system that is able to communicate with third party service orchestration systems and deliver a distributed service.

Programmable network platform 10000 may provide service orchestration of a business level service across heterogeneous service providers. The definition of the service policy, quality, service level agreements and cost as a coordinated service topology may be provided at programmable network platform 10000. Programmable network platform 10000 may define the individual sub-component level topology, policy, SLA and cost in terms of specification and enforcement.

Figure 7:
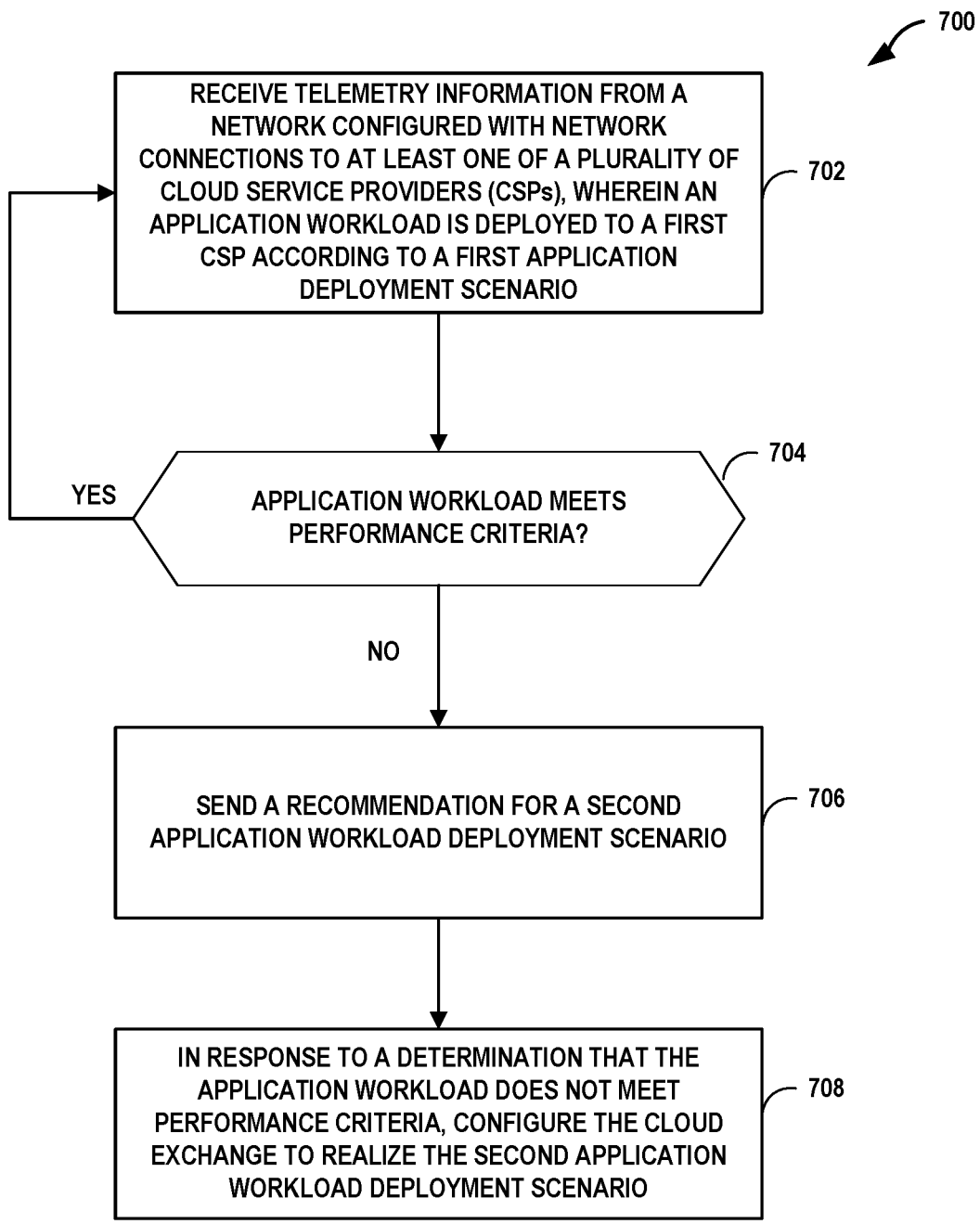
FIG. 7 is a flowchart illustrating an example operation of a cloud exchange that offers performance-based recommendation services for enterprise workload orchestration, in accordance with the techniques described in this disclosure.

Programmable network platform 10000 is an intelligent centralized service delivery and assurance system with the ability to have fault mitigation Monitor/Analyze/Plane/Execute (MAPE) loop, as shown in FIGS. 7 and 9 that will ensure the service delivered by the system is assured to adhere the service level agreement for the life cycle of the service. Programmable network platform 10000 not only delivers services that can be offered by its own delivery infrastructure but also has the capability to communicate across other third-party orchestration systems to deliver a combined homogeneous service. Programmable network platform 10000, or more specifically CNC system 10002, may be the central control center for both operations and business related functions to be performed.

NFU 10004 and CNC system 10002 may also fulfill the need for having a distributed orchestration system for creating services and distributing the intelligence of delivering and assuring service. Additionally, NFU 10004 and CNC system 10002 may fulfill the need for the distributed system to be able to communicate with third party service orchestration systems to deliver a distributed service. Programmable network platform 10000 provides the advantage of providing a distributed, horizontally scaling architecture. CNC 10002 and one or more NFUs 10004 may provide the functionality of delivering and assuring a business service into two distinctly separate functions, (1) CNC—may handle the function of converting the business request into service parameters, (2) NFU—may handle the function of converting the service parameters into network parameters and instantiating the service.

In accordance with the techniques described in this disclosure, CNC 10002 includes a recommendation engine 10032 that provides performance-based recommendation of application workload deployment scenarios. As described in this disclosure, recommendation engine 10032 may determine from the telemetry information obtained from cloud service providers and the cloud exchange (stored in STAD 10016 and/or NTAD 10026), and determine whether the performance of an existing application workload deployment scenario meets the performance objectives (e.g., SLO). If the telemetry information does not meet the performance objectives, recommendation engine 10032 may provide the customer with a recommendation for a new application workload deployment scenario.

Recommendation engine 10032 may include a template generator (not shown) to generate deployment templates to realize the new application workload deployment scenario. For example, the recommendation engine 10032 may generate a deployment template including information to configure a service mesh of a cloud service provider to implement the new application workload deployment scenario, e.g., implementing Kubernetes-specific attributes for microservices.

Recommendation engine 10032 may also access financial logic 10018 to determine the budget or cost preference of a customer. As described above, financial logic 10018 may also store the customer's preference of whether the recommendation is to be cost-focused or performance-focused, as further described in FIG. 6 below. Recommendation engine 10032 may generate a recommendation for a new application workload deployment scenario based on the budget and/or preferred focus (e.g., cost or performance) and send the recommendation to the customer.

Figure 6:
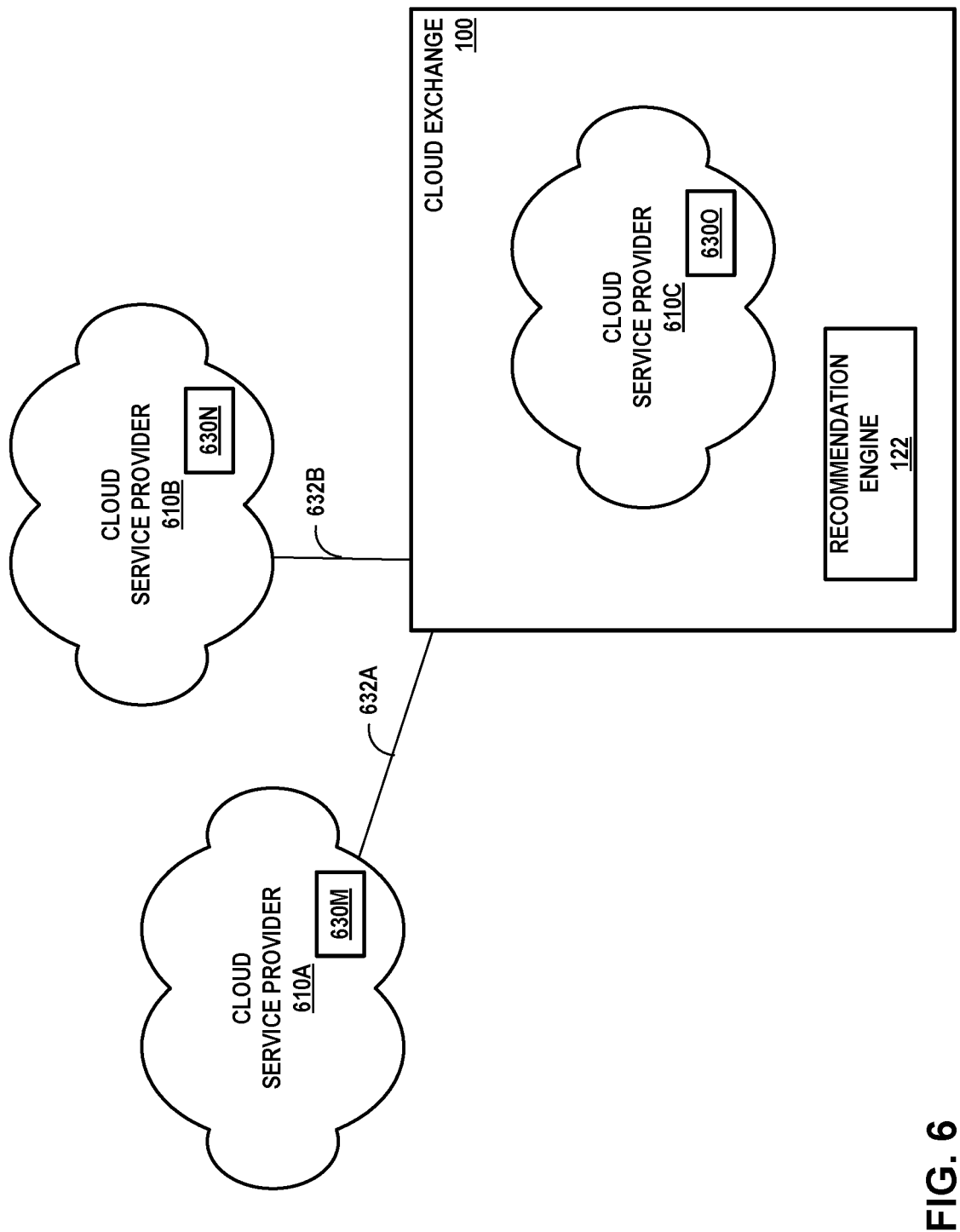
FIG. 6 is a block diagram illustrating an example use case of a performance and cost-based recommendation of a new application workload deployment scenario, in accordance with the techniques described in this disclosure.

FIG. 6 is a block diagram illustrating an example use case of a performance and cost-based recommendation of a new application workload deployment scenario, in accordance with the techniques described in this disclosure. Each request to deploy an application workload may result in multiple deployment options. In the example of FIG. 6, a first deployment option may deploy application workload 630M in cloud service provider 610A that is external to cloud exchange 100 with connection 632A to a portion of the application workload (e.g., application workload 630O) deployed in cloud service provider 610C located within a data center that includes cloud exchange 100 (also referred to herein as "co-located cloud service provider 610C"). A second deployment option may deploy application workload 630N in cloud service provider 610B that is external to cloud exchange 100 with connection 632B to a portion of the application workload (e.g., application workload 630O) deployed in on-premises cloud service provider 610C located within cloud exchange 100.

Each of the deployment options may have different overall cost estimates and/or performance. The recommendation engine 122 may provide the customer with one or more deployment options based on a cost-focused deployment option and/or performance-focused deployment option.

As described in this disclosure, recommendation engine 122 may determine the performance of the deployment options based on telemetry information obtained from cloud service providers and cloud exchange 100. Recommendation engine 122 may determine the total cost ($C_{total}$) for an application workload deployment based on the following:

$$C_{total}=C_{compute}+C_{storage}+C_{network}+C_{data}$$

The cost of compute ($C_{compute}$) and cost of storage ($C_{storage}$) is the cost of compute and storage resources, respectively, of an external cloud service provider used to deploy the application workload. For example, the cost of compute and storage for the first deployment option is computed based on the cost of compute and storage nodes of cloud service provider 610A used to implement application workload 630M. Similarly, the cost of compute and storage for the second deployment option is computed based on the cost of compute and storage nodes of cloud service provider 610B used to implement application workload 630N.

The cost of the network connection ($C_{network}$) is the cost of the connection between application workloads in two different providers. In this example, the cost of the network connection for the first deployment option is the cost of connection 632A between cloud service provider 610A and on-premises cloud service provider 610C. The cost of the network connection for the second deployment option is the cost of connection 632B between cloud service provider 610B and on-premises cloud service provider 610C. Such connection cost varies with the providers based on parameters, such as link speed/bandwidth, endpoints, direct or remote, etc.

The cost of data moving around ($C_{data}$) is calculated based on egress charges by the cloud service provider for the data moving out of the cloud service provider. For example, for the first deployment option, when data for application workload 630M is moving out of cloud service provider 610A to on-premises cloud service provider 610C, an egress charge may incur. Similarly, for the second deployment option, when data for application workload 630N is moving out of cloud service provider 610B to on-premises cloud service provider 610C, an egress charge may incur.

For a cost-focused deployment option, recommendation engine 122 may provide the customer with the deployment option with the lowest cost that also meets the required SLO. As one example, two workloads (e.g., one deployed in external cloud service provider and one deployed in on-premises cloud service provider) with frequent back and forth communication should be located close to each other. The deployment option in which the two workloads are far apart is likely to result in sub-optimal overall performance. In this example, recommendation engine 122 may consider the latency of connections to cloud service providers when selecting deployment options. For example, connection 632A may have a latency of 30 ms whereas connection 632B may have a latency of 60 ms. If the latency for each of the deployment options meet the SLO, the recommendation engine 122 may provide customers with a recommendation with the deployment option with the lowest cost. If, for example, due to the larger latency for connection 632B, the performance for deployment 630N falls outside the SLO, recommendation engine 122 may select the deployment option with connection 632A even if the deployment option with connection 632B has the lowest overall cost.

For the performance-focused deployment option, a deployment option with the same or slightly higher cost may be selected if the deployment option has better performance. In general, the deployment option with a lower latency and/or higher capacity (e.g. first deployment option) may usually result in better performance than the deployment option with higher latency and/or lower capacity (e.g. the second deployment option). If both deployment options have the same overall cost estimates, or the deployment option with the lower latency may have a slightly higher cost, the recommendation engine 122 may select the deployment option with the better performance, e.g., the first deployment option.

FIG. 7 is a flowchart illustrating an example operation of a cloud exchange that offers performance-based recommendation services for enterprise workload orchestration, in accordance with the techniques described in this disclosure. FIG. 7 is described with respect to cloud exchange 100 of FIG. 1.

In the example of FIG. 7, programmable network platform 120 of cloud exchange 100 receives telemetry information of a network of cloud exchange 100 configured with respective network connections to at least one of a plurality of cloud service providers (e.g., CSPs 110), wherein an application workload is deployed to a first CSP (e.g., CSP 110A) according to a first application workload deployment scenario (702). For example, cloud service provider 110A may initially deploy an application workload implemented as microservices 130. Programmable network platform 120 of cloud exchange 100 may interface with CSP 110A to obtain telemetry information of CSP 110A. For example, programmable network platform 120 may use an external interface to interface with a service mesh manager (e.g., istiod) for the service mesh for microservices 130 implemented in cloud service provider 110A. Programmable network platform 120 also receives telemetry information of the cloud exchange. For example, programmable network platform 120 may obtain telemetry information of network connections instantiated within the network infrastructure of the cloud exchange 100 for the application workload (e.g., virtual circuit 136).

Cloud exchange 100 determines, based on the telemetry information of the network, whether the application workload meets the performance objective (704). For example, recommendation engine 122 of programmable network platform 120 may determine, based on the telemetry information, whether the existing application workload deployment ("first application workload deployment") meets the SLO. If the telemetry information for the existing application workload deployment meets the performance objective ("YES" of step 704"), no change is made to the existing application workload deployment and the programmable network platform 120 may perform the recommendation services operation 700 in response to receiving subsequent telemetry information. If the telemetry information for the existing application workload deployment does not meet the performance objective ("NO" of step 704), the cloud exchange may provide a recommendation for a second application workload deployment scenario that meets the performance objectives, wherein the recommendation includes a deployment template to configure another CSP of the plurality of CSPs with the new application workload deployment scenario (706). In some examples, the recommendation for the second deployment scenario includes a deployment template (e.g., Istio template) that the service mesh manager may use to configure the service mesh of cloud service provider 110N to realize the second application workload deployment scenario. For example, the deployment template may include Kubernetes-specific attributes for microservices 132.

In some examples, the recommendation is based on the cost of deploying the new application workload scenario. For example, recommendation engine 122 may determine the cost of compute and/or storage nodes provided by CSPs 110 to implement the new application workload. Recommendation engine 122 may also determine the cost to instantiate connections within cloud exchange 100 to realize the new application workload. When generating the recommendation for the new application workload deployment scenario, recommendation engine 122 may take into consideration the budget of the customer and provide the recommendation if the cost to realize the new application workload deployment scenario is within the customer's budget. In some examples, the recommendation for the new application workload deployment scenario includes the cost to realize the new application workload deployment scenario, such as the cost of compute/storage nodes provided by CSP 110N to implement microservices 132 for the new application workload and the cost to instantiate virtual circuit 138 to connect customer 108A to the new application workload provided by CSP 110N.

In some examples, programmable network platform 120 may, alternatively or additionally, in response to a determination that the application workload does not meet the performance objective, dynamically configure cloud exchange 100 to realize the second application workload deployment scenario (708). For example, in response to determining that the first application workload (e.g., microservices 130) does not meet the performance objective, recommendation engine 122 may cause programmable network platform 120 to dynamically configure cloud exchange 100 to, for instance, facilitate virtual connections (e.g., virtual circuit 138) for cloud-based services delivery from cloud service providers 110N to cloud customer 108A.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A cloud exchange comprising:
a network configured with respective network connections to at least one of a plurality of cloud service providers (CSPs), wherein an application workload is deployed to a first CSP of the plurality of CSPs according to a first application workload deployment scenario, wherein the first application workload deployment scenario comprises a first network connection, within a switching fabric of the cloud exchange, to the application workload deployed to the first CSP of the cloud exchange; and
a programmable network platform comprising processing circuitry and configured to:
receive telemetry information of the network for the network connections;
determine, based on the telemetry information of the network, whether the first network connection to the application workload deployed to the first CSP meets a performance objective; and
in response to a determination that the first network connection to the application workload deployed to the first CSP does not meet the performance objective, send, to the customer, a recommendation for a second application workload deployment scenario, wherein the recommendation includes a deployment template to configure a second CSP of the plurality of CSPs with the second application workload deployment scenario, the deployment template including network connection information for configuring, within the switching fabric of the cloud exchange, a second network connection, within the switching fabric of the cloud exchange, to the application workload deployed to the second CSP, wherein the second network connection to the application workload deployed to the second CSP has a lower latency relative to the first network connection to the application workload deployed to the first CSP.

2. The cloud exchange of claim 1,
wherein the telemetry information comprises telemetry information of the plurality of CSPs, and
wherein to determine whether the first network connection to the application workload deployed to the first CSP meets the performance objective, the programmable network platform is further configured to determine whether the telemetry information of the plurality of cloud service providers meets the performance objective.

3. The cloud exchange of claim 2,
wherein each of the plurality of CSPs includes a service mesh, and
wherein, to receive telemetry information of the plurality of CSPs, the cloud exchange is further configured to interface with respective service mesh managers of the plurality of CSPs.

4. The cloud exchange of claim 1, wherein the second application workload deployment scenario is based on a cost to implement the second application workload deployment scenario.

5. The cloud exchange of claim 4, wherein the cost to implement the second application workload deployment scenario comprises a cost of compute or storage nodes to implement the second application workload deployment scenario in the second CSP and a cost of the second network connection within the switching fabric of the cloud exchange for the second application workload deployment scenario.

6. The cloud exchange of claim 1, wherein the programmable network platform is further configured to select, based on a cost-focused deployment, the second application workload deployment scenario from a plurality of application workload deployment scenarios,
wherein each of the plurality of application workload deployment scenarios meet the performance objective, and wherein the second application workload deployment scenario has a lower cost than other application workload deployment scenarios of the plurality of application workload deployment scenarios.

7. The cloud exchange of claim 1, wherein the programmable network platform is further configured to select, based on a cost-focused deployment, the second application workload deployment scenario from a plurality of application workload deployment scenarios,
wherein the second application workload deployment scenario meets the performance objective and the first application workload deployment scenario does not meet the performance objective, and
wherein the first application workload deployment scenario has a lower cost than the second application workload deployment scenario.

8. The cloud exchange of claim 1, wherein the programmable network platform is further configured to select, based on a performance-focused deployment, the second application workload deployment scenario from a plurality of application workload deployment scenarios,
wherein the second application workload deployment scenario has a higher cost than other application workload deployment scenarios of the plurality of application workload deployment scenarios, and
wherein the second application workload deployment scenario has a higher performance than other application workload deployment scenarios of the plurality of application workload deployment scenarios.

9. A method comprising:
receiving, by a programmable network platform of a cloud exchange comprising a network configured with respective network connections to at least one of a plurality of cloud service providers (CSPs), telemetry information of the network for the network connections, wherein an application workload is deployed to a first CSP of the plurality of CSPs according to a first application workload deployment scenario, wherein the first application workload deployment scenario comprises a first network connection, within a switching fabric of the cloud exchange, to the application workload deployed to the first CSP of the cloud exchange;
determining, by the programmable network platform and based on the telemetry information of the network, whether the first network connection to the application workload deployed to the first CSP meets a performance objective; and
in response to determining that the first network connection to the application workload deployed to the first CSP does not meet the performance objective, sending, by the programmable network platform and to the customer, a recommendation for a second application workload deployment scenario, wherein the recommendation includes a deployment template to configure a second CSP of the plurality of CSPs with the second application workload deployment scenario, the deployment template including network connection information for configuring, within the switching fabric of the cloud exchange, a second network connection, within the switching fabric of the cloud exchange, to the application workload deployed to the second CSP, wherein the second network connection to the application workload deployed to the second CSP has a lower latency relative to the first network connection to the application workload deployed to the first CSP.

10. The method of claim 9,
wherein the telemetry information comprises telemetry information of the plurality of CSPs, and
wherein determining whether the first network connection to the application workload deployed to the first CSP meets the performance objective comprises determining whether the telemetry information of the plurality of cloud service providers meets the performance objective.

11. The method of claim 10, wherein each of the plurality of CSPs includes a service mesh, the method further comprising:
receiving, through an interface with a respective mesh manager of the plurality of CSPs, the telemetry information of the plurality of CSPs.

12. The method of claim 9, wherein determining whether the application workload meets the performance objective further comprises:
determining, by the programmable network platform, a cost to implement the second application workload deployment scenario.

13. The method of claim 12, wherein determining the cost to implement the second application workload deployment scenario comprises:
determining a cost of compute or storage nodes to implement the second application workload deployment scenario in the second CSP and a cost of the second network connection within the cloud exchange for the second application workload deployment scenario.

14. The method of claim 9, the method further comprising:
selecting, by the programmable network platform, based on a cost-focused deployment, the second application workload deployment scenario from a plurality of application workload deployment scenarios,
wherein each of the plurality of application workload deployment scenarios meet the performance objective, and
wherein the second application workload deployment scenario has a lower cost than other application workload deployment scenarios of the plurality of application workload deployment scenarios.

15. The method of claim 9, the method further comprising:
selecting, by the programmable network platform, based on a cost-focused deployment, the second application workload deployment scenario from a plurality of application workload deployment scenarios,
wherein the second application workload deployment scenario meets the performance objective and the first application workload deployment scenario does not meet the performance objective, and
wherein the first application workload deployment scenario has a lower cost than the second application workload deployment scenario.

16. The method of claim 9, the method further comprising:
selecting, by the programmable network platform, the second application workload deployment scenario based on a performance-focused deployment,
wherein the second application workload deployment scenario has a higher cost than other application workload deployment scenarios of the plurality of application workload deployment scenarios, and
wherein the second application workload deployment scenario has a higher performance than other application workload deployment scenarios of the plurality of application workload deployment scenarios.

17. The method of claim 9, the method further comprising:

in response to determining that the application workload does not meet the performance objective, configuring, by the programmable network platform, the cloud exchange to realize the second application workload deployment scenario.

18. A non-transitory computer readable storage medium comprising instructions that, when executed, cause at least one programmable processor of a programmable network platform of a cloud exchange to:

receive telemetry information of a network of the cloud exchange, the network configured with respective network connections to at least one of a plurality of cloud service providers (CSPs), wherein an application workload is deployed to a first CSP of the plurality of CSPs according to a first application workload deployment scenario, wherein the first application workload deployment scenario comprises a first network connection, with a switching fabric of the cloud exchange, to the application workload deployed to the first CSP of the cloud exchange;

receive telemetry information of the network for the network connections;

determine, based on the telemetry information of the network, whether the first network connection to the application workload deployed to the first CSP meets a performance objective; and in response to a determination that the first network connection to the application workload deployed to the first CSP does not meet the performance objective, send, to a customer, a recommendation for a second application workload deployment scenario, wherein the recommendation includes a deployment template to configure a second CSP of the plurality of CSPs with the second application workload deployment scenario, the deployment template including network connection information for configuring, within the switching fabric of the cloud exchange, a second network connection, within the switching fabric of the cloud exchange, to the application workload deployed to the second CSP, wherein the second network connection to the application workload deployed to the second CSP has a lower latency relative to the first network connection to the application workload deployed to the first CSP.

19. The non-transitory computer readable storage medium of claim 18, wherein the telemetry information comprises telemetry information of the plurality of CSPs, and wherein to determine whether the application workload meets the performance objective, the instructions further cause the at least one programmable processor of the programmable network platform to determine whether telemetry information of the plurality of cloud service providers meets the performance objective.

20. The non-transitory computer readable storage medium of claim 18, wherein the instructions further cause the at least one programmable processor of the programmable network platform to:

determine a cost of compute or storage nodes to implement the second application workload deployment scenario in the second CSP and a cost of the second network connection within the switching fabric of the cloud exchange for the second application workload deployment scenario.

\* \* \* \* \*